(12) United States Patent
Tucker

(10) Patent No.: US 7,310,635 B2
(45) Date of Patent: Dec. 18, 2007

(54) RECORD MANAGEMENT AND RETRIEVAL COMPUTER PROGRAM AND METHOD

(75) Inventor: David A. Tucker, Ijamsville, MD (US)

(73) Assignee: Knowitall, LLC., Frederick, MD (US)

( * ) Notice: Subject to any disclaimer, the term of this patent is extended or adjusted under 35 U.S.C. 154(b) by 228 days.

(21) Appl. No.: 11/049,662

(22) Filed: Feb. 4, 2005

(65) Prior Publication Data

US 2005/0273454 A1 Dec. 8, 2005

Related U.S. Application Data

(60) Provisional application No. 60/521,535, filed on May 17, 2004.

(51) Int. Cl.
*G06F 7/00* (2006.01)

(52) U.S. Cl. .................... 707/3; 707/6; 707/1

(58) Field of Classification Search .......... 707/1–104.1
See application file for complete search history.

(56) References Cited

U.S. PATENT DOCUMENTS

| | | | |
|---|---|---|---|
| 5,375,235 A | | 12/1994 | Berry et al. |
| 5,845,273 A | | 12/1998 | Jindal |
| 6,094,694 A | | 7/2000 | Hickson et al. |
| 6,195,661 B1 | * | 2/2001 | Filepp et al. ............... 707/102 |
| 6,282,534 B1 | * | 8/2001 | Vora ............................... 707/3 |
| 6,421,675 B1 | | 7/2002 | Ryan et al. |
| 6,766,320 B1 | * | 7/2004 | Wang et al. .................... 707/5 |
| 6,829,612 B2 | * | 12/2004 | Neulight ....................... 707/10 |
| 6,856,986 B1 | * | 2/2005 | Rossides ........................ 707/1 |
| 2002/0099952 A1 | * | 7/2002 | Lambert et al. ............. 713/200 |
| 2002/0129033 A1 | * | 9/2002 | Hoxie et al. ................ 707/101 |
| 2003/0012415 A1 | | 1/2003 | Cossel |
| 2003/0158754 A1 | * | 8/2003 | Elkind ............................ 705/3 |
| 2003/0191743 A1 | | 10/2003 | Brodersen et al. |
| 2004/0157628 A1 | * | 8/2004 | Daniel et al. ................ 455/466 |
| 2004/0199528 A1 | * | 10/2004 | Kayamoto et al. ........... 707/100 |
| 2004/0205075 A1 | * | 10/2004 | LaTurner et al. ............ 707/100 |

* cited by examiner

*Primary Examiner*—Don Wong
*Assistant Examiner*—Linh Black
(74) *Attorney, Agent, or Firm*—Berenato, White & Stavish

(57) ABSTRACT

A record management and retrieval method, computer program, and system are provided. According to the method, in response to a user search query including a query search term, a private search space containing a plurality of electronically recallable internal information records, each internal information record of the plurality of electronically recallable internal information records having a keyword field with an associated keyword; is electronically searched. From the private search space, an internal information record whose associated keyword in the keyword field matches the query search term is identified. The identified internal information record is presented to the user.

17 Claims, 22 Drawing Sheets

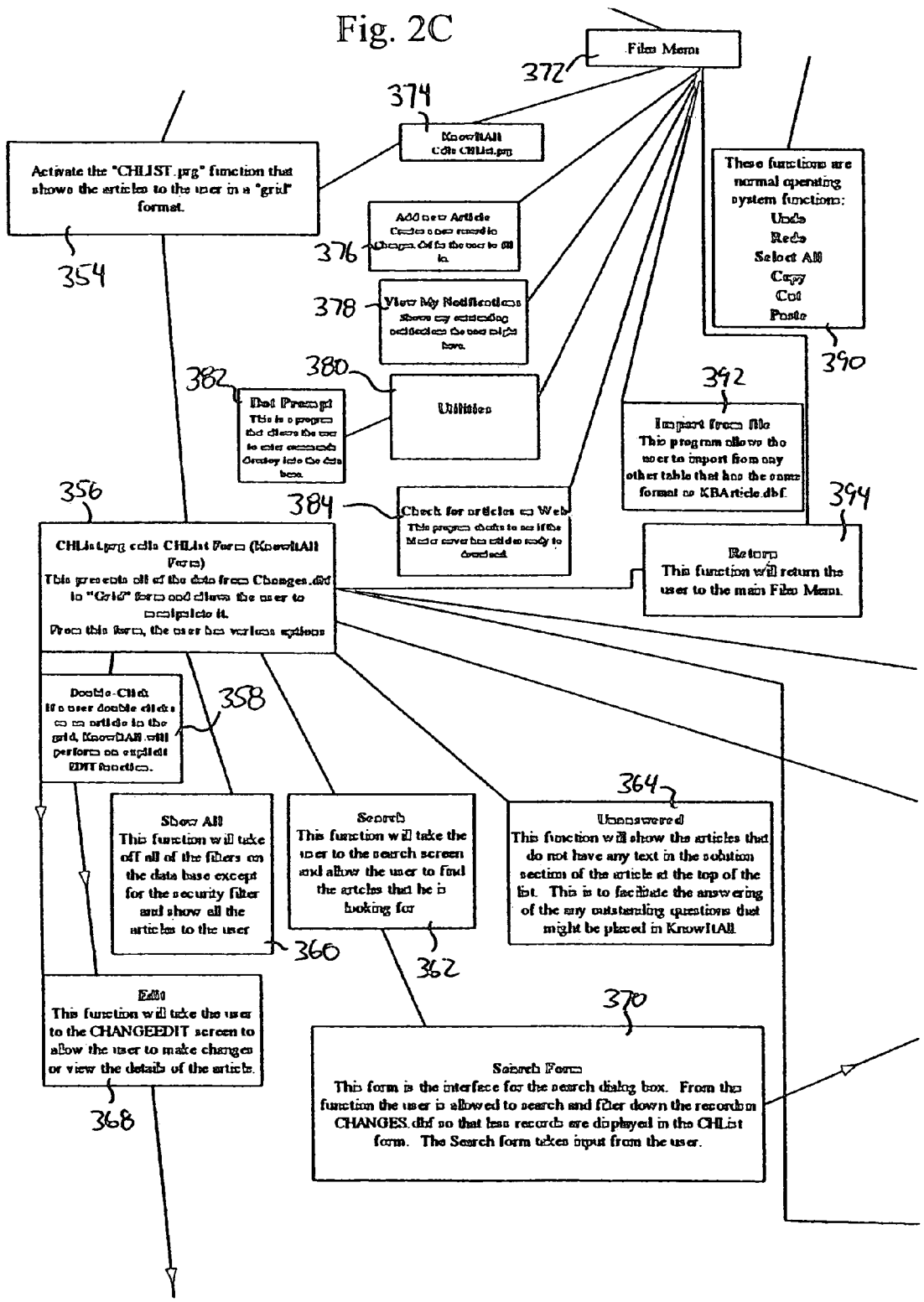

Fig. 3

| Topic | Open | Question/Title | Solution | Date | Seq | Views | Attach |
|---|---|---|---|---|---|---|---|
| | | Where to order pizza for lunch? | Pizza Place 555-555-1111 Two-fer-One specials on Tuesdays | | 580 | | |
| | | Where to order submarines? | Dave's Sandwiches 555-555-2222 | 02/02/2005 | 581 | 1 | |
| | | Where to go for breakfast nearby? | Bagel Store 555-555-3333 Order 12, get 2 free | 02/02/2005 | 582 | 0 | |
| ALLVISU | | Why doesn't CLIP give error information any more? | get update 3197 / 3326 | 08/30/2004 | 587 | 0 | |
| BLANK | | What are the blood types for my family? | | 04/28/2004 | 584 | 0 | |
| BLANK | | I receive the following message when opening KnowItAll: The resource file is not valid. Overwrite it with a new one? | Verify the permissions on the share and files on the server (main) computer. Full permissions are needed | 10/08/2004 | 589 | 1 | |
| CLIP | | When trying to import information from Quickbooks into Qclip | Make sure logged as administrator | 07/24/2002 | 1 | 0 | |
| CLIP | | c:\programfiles\outlookexpress\maindb\errorlog.dbf does not exist | Same as before, the problem is that the emailing program is bombing, this sends an error to FoxPro and FoxPro | 07/25/2002 | 2 | 0 | |
| CLIP | | When you go to print an invoice and your logo is too big or corrupted you get a system eb. | Have the customer change the cologo file in the BMP directory. He can rename it and then copy the | 07/25/2002 | 3 | 0 | |
| CLIP | | Installing the Visual install and was getting error 115 Component : Font Files | Go to the control pannel and then select the fonts folder and delete the C39HDM2.TTF and problem will be fix | 07/29/2002 | 4 | 0 | |
| CLIP | | The customer receives an error 43 (Insufficient memory) when trying to enter a customer's history in the File | The "High Speed CPU" History Filter must be enabled. This is enabled via System>High Speed CPU>"Is your CPU | 07/31/2002 | 5 | 0 | |
| CLIP | | When you try to print invoices with notes and gets system ab | 1. Go to windows settings and make sure the font size isn't large make sure its normal | 07/31/2002 | 6 | 2 | |
| CLIP | | When viewing the invoice in QuickBooks, the amount for the line item is not the amount charged in qCLIP | This occurs when there is an amount/rate for the item in QuickBooks. To correct this, you need | 08/01/2002 | 7 | 0 | |
| CLIP | | Try to Get all work done for the month done for one invoice for contract customers. | If you want all jobs recorded for the month that are installment jobs, to show up on one invoice you have to | 08/02/2002 | 8 | 0 | |
| CLIP | | On exiting vCLIP the user gets an error saying "Cannot | Check for the name of the user and make sure that it does not contain | 08/05/2002 | 9 | 0 | |

RECORD MANAGEMENT AND RETRIEVAL COMPUTER PROGRAM AND METHOD

RELATED APPLICATION

This application claims the benefit of priority of U.S. Provisional Patent Application No. 60/521,535 filed on May 17, 2004 and entitled "COMPUTER SOFTWARE AND METHOD FOR MANAGING INTERNAL OFFICE KNOWLEDGE," the complete disclosure of which is incorporated herein by reference.

COMPUTER PROGRAM LISTING

A computer program listing appendix is submitted herewith on compact disc recordable (CD-R) as Appendix A. Duplicate copies of Appendix A are provided as Copy 1 and Copy 2. The materials on the CD-R are identical to each other.

The files on the compact discs are incorporated herein by reference, and are listed below:

| File Name | Size in bytes | Date |
|---|---|---|
| B.PRG | 2780 | Aug. 23, 2004 |
| ABOUTKNOWITALL.PRG | 1331 | Aug. 6, 2004 |
| ARTICLENOTIFY.PRG | 17303 | Apr. 14, 2004 |
| ARTICLESEC.PRG | 3024 | Aug. 8, 2004 |
| B.PRG | 473 | Dec. 23, 2003 |
| CALGETDATE.PRG | 349 | Dec. 30, 2001 |
| CHANGES.PRG | 44847 | Feb. 1, 2005 |
| CHECKFORARTICLES.PRG | 2945 | Jan. 18, 2005 |
| CHECKINTERNETCONNECTION.PRG | 337 | Mar. 26, 2004 |
| CHLISTOPEN.PRG | 632 | Dec. 3, 2004 |
| CHOOSENEWFILETYPE.PRG | 73 | Jun. 8, 2004 |
| CHOOSENEWSCANTYPE.PRG | 73 | Oct. 18, 2004 |
| CHOOSEWHATTODO.PRG | 55 | Jan. 5, 2005 |
| CKDATA.PRG | 3591 | Dec. 23, 2003 |
| CK_FULLUSE.PRG | 824 | Oct. 22, 2004 |
| CLINDE.PRG | 708 | Aug. 12, 2002 |
| CLPREG.PRG | 3727 | Jan. 12, 2004 |
| CM_INDEX.PRG | 541 | Jan. 14, 2002 |
| CONTACTINFO.PRG | 737 | Oct. 25, 2004 |
| CT_IMPORTCONTACTS.PRG | 6993 | Jan. 3, 2005 |
| CUST_CULIST.PRG | 5244 | Apr. 16, 2003 |
| EMAIL.PRG | 3118 | Jan. 15, 2002 |
| EMAILPICK.PRG | 1159 | Oct. 25, 2004 |
| ERROR_USERCOMMENTS.PRG | 63 | Dec. 15, 2003 |
| ERR_TRAP.PRG | 9095 | Dec. 25, 2003 |
| EZTWAIN.PRG | 77464 | Jun. 17, 2004 |
| FTP.PRG | 48878 | Jun. 10, 2004 |
| FTP_DOWNLOAD.PRG | 4305 | Dec. 29, 2004 |
| GETCHR.PRG | 1696 | Jun. 8, 2004 |
| GETDATE.PRG | 1649 | Dec. 13, 2000 |
| GETRELC.PRG | 277 | Jan. 25, 2005 |
| GETSERIALNUMBER.PRG | 438 | Aug. 4, 2004 |
| GET_PRODCODE.PRG | 29437 | Jan. 28, 2005 |
| HEXCODE.PRG | 1469 | Mar. 25, 2004 |
| IMPORTCMS.PRG | 1091 | Sep. 12, 2004 |
| INPUTBOX2.PRG | 828 | Mar. 18, 2004 |
| K.PRG | 523 | Apr. 15, 1998 |
| KB_IMPORT.PRG | 3241 | Jan. 24, 2005 |
| KB_RESETSCREEN.PRG | 319 | Jan. 13, 2004 |
| KB_UPDATE.PRG | 1471 | Dec. 29, 2003 |
| KIAEMAILPICK.PRG | 1329 | Jan. 19, 2005 |
| LAN_CLOSE | 345 | Dec. 13, 2001 |
| LAN_USE.PRG | 2216 | Dec. 13, 2001 |
| LOOKUP.PRG | 2264 | Oct. 28, 2004 |
| MAP_FINDONEADDRESS.PRG | 3244 | Jan. 25, 2005 |
| MYPATH.PRG | 386 | Apr. 22, 2003 |
| NOTE.PRG | 1691 | Apr. 14, 2004 |
| OFFICAPI.PRG | 12773 | Oct. 19, 2004 |
| P.PRG | 10543 | Dec. 25, 2003 |
| PRODCORESULTS.PRG | 243 | Mar. 25, 2004 |
| PUBLISHTEXT.PRG | 52 | Mar. 25, 2004 |
| P_CMS.PRG | 82 | Jan. 14, 2002 |
| QB_GL_LOOKUP.PRG | 487 | Jan. 14, 2002 |
| QB_GNAME.PRG | 1046 | May 24, 2002 |
| REG_BYPHONE.PRG | 378 | Jan. 28, 2005 |
| REG_ENTERCODE.PRG | 202 | Apr. 13, 2004 |
| REINIT.PRG | 1547 | May 14, 2004 |
| REPORTGEN.PRG | 1506 | Dec. 30, 2001 |
| REP_PRIN.PRG | 7033 | Jan. 12, 2004 |
| REST_ENV.PRG | 6808 | Dec. 7, 2003 |
| RESULTSTOTEXT.PRG | 907 | Mar. 25, 2004 |
| RINDEX.PRG | 3472 | Dec. 10, 2004 |
| RW_FTIME.PRG | 1062 | Jan. 26, 2000 |
| SAVE_ENV.PRG | 7436 | Dec. 7, 2003 |
| SCANIN.PRG | 3535 | Jan. 5, 2005 |
| SEARCHWHOLEWORD.PRG | 1944 | Mar. 25, 2004 |
| SPELLCHECK.PRG | 2092 | Nov. 4, 2003 |
| SUBJECT_LIST.PRG | 5246 | Apr. 17, 2003 |
| SYNCHRONIZE.PRG | 6523 | Jul. 30, 2004 |
| TEST.PRG | 819 | Oct. 24, 2004 |
| TESTWRITERIGHTS.PRG | 773 | Jan. 24, 2005 |
| UDF.PRG | 1395 | Jun. 17, 2004 |
| USERCOPY.PRG | 926 | Jan. 27, 2004 |
| USERSETUP.PRG | 3511 | Dec. 10, 2004 |
| UTILITIES.PRG | 4929 | Jan. 13, 2004 |
| UT_ADDDRIVEPATH.PRG | 146 | Oct. 8, 2004 |
| UT_CHECKFORLOCALDIR.PRG | 252 | Jan. 17, 2005 |
| UT_DECRYPT.PRG | 267 | Feb. 12, 2004 |
| UT_ENCRYPT.PRG | 275 | Feb. 12, 2004 |
| UT_FINDFILE.PRG | 1068 | Apr. 27, 2004 |
| UT_REMOVEENTER.PRG | 358 | Nov. 19, 2004 |
| UT_THERM.PRG | 728 | Dec. 2, 2004 |
| UT_USEREMAIL.PRG | 526 | Dec. 16, 2004 |
| WARN.PRG | 235 | Dec. 19, 2003 |
| X3GOURL.PRG | 2069 | Dec. 7, 2004 |
| XBOMB.PRG | 1883 | Apr. 13, 2004 |
| XDOT.PRG | 3861 | Jan. 17, 2005 |
| XMLPUB.PRG | 3669 | Jan. 24, 2005 |
| XML_KIACODE.PRG | 4044 | Apr. 19, 2004 |
| XPWSEC.PRG | 3919 | Apr. 7, 2004 |
| YESNO.PRG | 1990 | Jan. 28, 2004 |

BACKGROUND OF THE INVENTION

1. Field of the Invention

The present invention generally relates to the fields of electronic information management and retrieval, and in particular embodiments is especially useful for management of internal information records, such as those internal informational records relevant to the operation of a business or personal to an individual.

2. Description of the Related Art

Computers are found and used in practically every aspect of society. Many factors have driven the growth of computers, and in particular personal computers. For example, advancements in hardware capability and usage, as well as the increasing usefulness of the Internet, have greatly contributed to the popularity and widespread use of personal computers. Today, computers are instrumental tools in many applications and areas, including, for example, personal finance, entertainment, education, communication, business, and personal interest. Specific activities that computers are used for include paying of bills, shopping, viewing of television or movies, reading of magazines and newspapers, and conversing with others, such as via e-mail or in an on-line forum. All of these activities can be performed from the convenience of home or a work desk using a personal computer.

Among the advancements in hardware capability that have fueled the growth of computer usage is the ability to store large amounts of data on storage media, such as disc drives (e.g., CD, DVD), hard disc drives, ZIP drives, and servers. These and other storage media and their ability to store records, data, and other information provide a strong inducement for businesses and consumers to integrate computers into their lives. For example, the ability of users to convert and store hardcopy documents, such as letters, bills, papers, proposals, manuals, etc. in electronic format on compact electronic storage media greatly reduces the physical space required for retaining paper records or "hard copies".

Another benefit to storing data and other information on electronic storage media is accessibility. Storage media such as compact discs and the like are easily transportable, for example, between work and home, between different businesses, and on business trips. Networks may also be established for permitting multiple users to share data and records. Other tools, such as email and the Internet, provide still further means for accessing and sharing information.

Despite all of the above-described advantages, the storage of large amounts of data, files, documents, and other records in electronic format can create organizational and retrieval problems. As a society, perhaps never has more information been available than it is now. But the storage and availability of this information is negated if computer users, even unsophisticated computer users, cannot locate and retrieve the information in an efficient manner.

Information organizational and retrieval problems can become especially prevalent in business environments. For example, storing records electronically on CDs, floppy discs, hard drives, and other storage media not connected to a network can isolate other users from the records, and hence valuable information. Logic trees are used for data organization, but generally are difficult to understand and lack meaningful directory and sub-directory labels. The inability of a business to efficiently share its information among employees can lead to inefficiencies and waste. Time and resources are often squandered trying to locate existing information that is not easily accessible or properly stored. Records that are not found or properly stored for retrieval are often assumed missing or non-existent, thereby causing an employee to recreate or recompile the information contained in the record from scratch. Further, in the event that the business lacks a protocol or system for updating and retrieving information, superseded documents may be unknowingly accessed and used. These problems can lead to immeasurable disorder and loss of employee time and company resources.

Another area in which storage, sharing, and retrieval of business information is important relates to employee knowledge and know-how. A departing or absent employee often is the sole person at a business who possesses knowledge of certain business practices, know-how, or other information. Departure of the employee can leave a large information void that, if not otherwise prepared for, can be difficult or impossible to recover. Many businesses deal with this problem in one of two ways: (1) keep knowledgeable yet non-productive employees on the payroll, or (2) accept the loss of the employee as a "cost of doing business" and absorb the resulting informational loss and the financial cost of training a new employee. Small businesses having few employees are especially vulnerable to this particular problem. For example, in a business having four employees, loss of a single employee may constitute an about 25% loss of corporate memory.

Another potential problem area for information storage, sharing, and retrieval relates to Internet usage. Internet access and familiarity have become necessities in business. Many businesses rely on the Internet for conducting substantial portions of their business, whether through on-line purchases or sales, advertising, or client correspondence. Although it has become easier to conduct business via the Internet, Internet usage can lead to problems. A single business may interact with multiple websites, each of which may be associated with a different user name and password. User names and passwords not properly accessible amongst employees can impede business Internet activities and can cause security problems. Further, re-locating an important or relevant website can be difficult if the website address is not properly recorded for future reference.

Small and large business, organizations, churches, and other entities, as well as individuals, routinely rely on vast amounts of information to conduct day-to-day operations. Such information may be found in or constituted by documents, manuals, procedures, contracts, spreadsheets, data, passwords, websites, etc. Failure to properly manage and efficient retrieve this information can impart great inefficiencies to one's business or personal affairs. Accordingly, there is a need for a computer program, a system, and related methods for efficiently managing information, permitting authorized individuals to access information while optionally providing security measures against the release of the information to unauthorized individuals, and allowing updates and retrieval of information without significantly disrupting the flow of normal business practice.

SUMMARY OF THE INVENTION

To achieve one or more of the foregoing objects, and in accordance with the purposes of the invention as embodied and broadly described herein, according to a first aspect of this invention there is provided a record management and retrieval method. According to the method, in response to a user search query comprising a query search term, a private search space comprising a plurality of electronically recallable internal information records is electronically searched, each internal information record of the plurality of electronically recallable internal information records having a keyword field for receiving an associated keyword. From the electronic search of the private search space, an internal information record whose associated keyword in the keyword field matches the query search term is identified and presented to the user.

A second aspect of the invention provides a computer usable medium for managing and retrieving internal information records. The computer usable medium comprising computer readable program code means for causing a computer to display a plurality of electronically recallable internal information records of a private search space to a user via a display unit, each internal information record of the plurality of electronically recallable internal information records having an associated keyword field for receiving a keyword. The computer usable medium further comprises computer readable program code means for receiving a user search query comprising a query search term. The computer usable medium further comprises computer readable program code means for identifying from the private search space an internal information record whose associated keyword in the keyword field matches the query search term, and computer readable program code means for displaying the identified internal information record to the user.

According to a third aspect of the invention, a system for managing and retrieving internal information records is provided. The system comprises a computing device, an input device for receiving a user search query comprising a query search term, an output device, and a private data storage comprising a plurality of electronically recallable internal information records. Each internal information record of the plurality of electronically recallable internal information records has an associated keyword field containing a keyword. The system further comprises a computer program loaded on the computing device for electronically searching the private data storage in response to the user search query, identifying from the data storage an internal information record whose associated keyword in the keyword field matches the query search term, and presenting identified internal information record on the output device to the user.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings:

FIGS. 2A through 2F are enlarged views of the flow chart of FIG. 1 divided into six regions;

FIGS. 3 through 16 are views of user interface screens of a computer program of an embodiment of the present invention.

Figure 1:
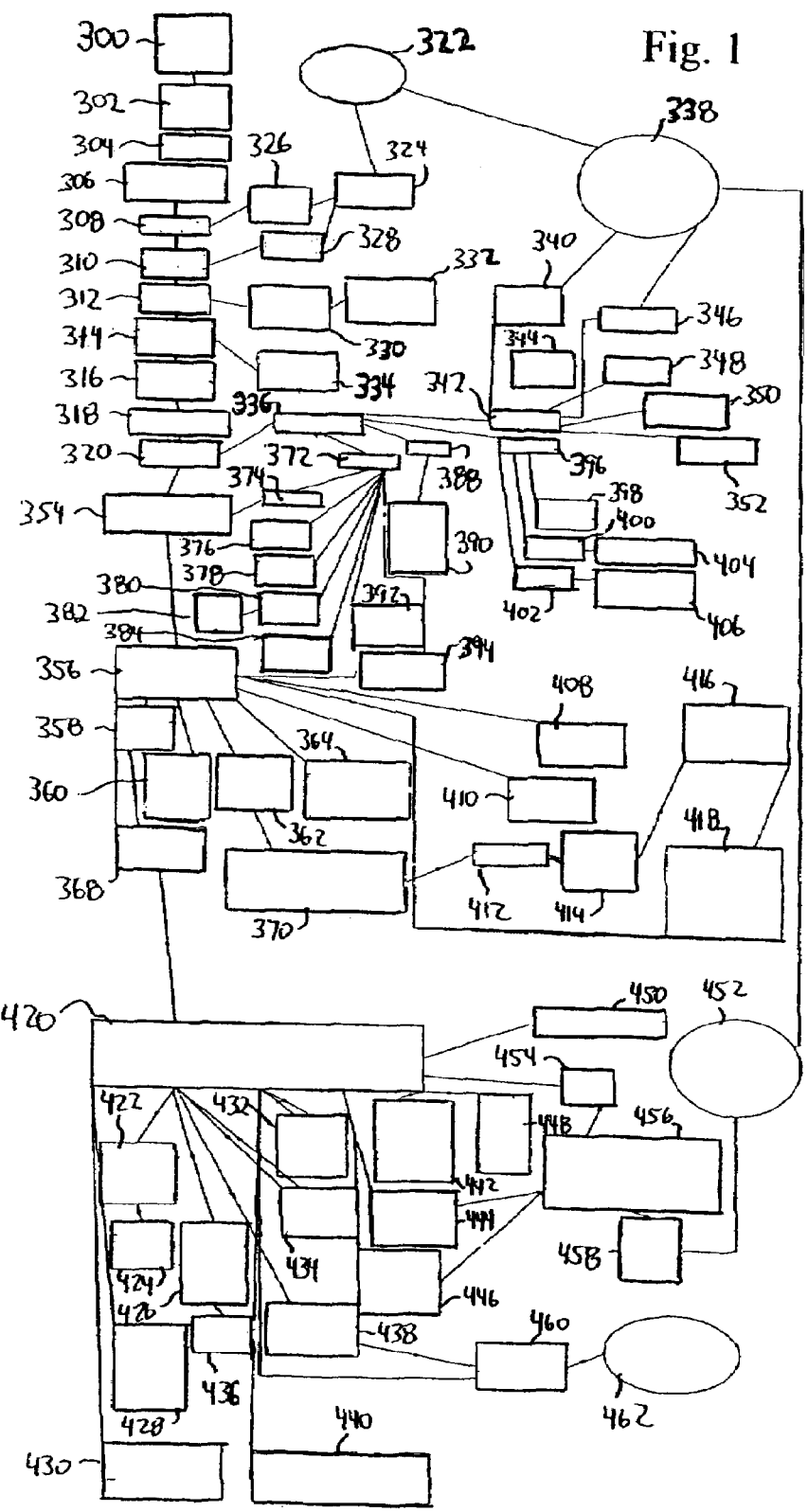
FIG. 1 is a flow chart representing the logic flow of the computer program embodied below in the detailed description.
Figure 2A:
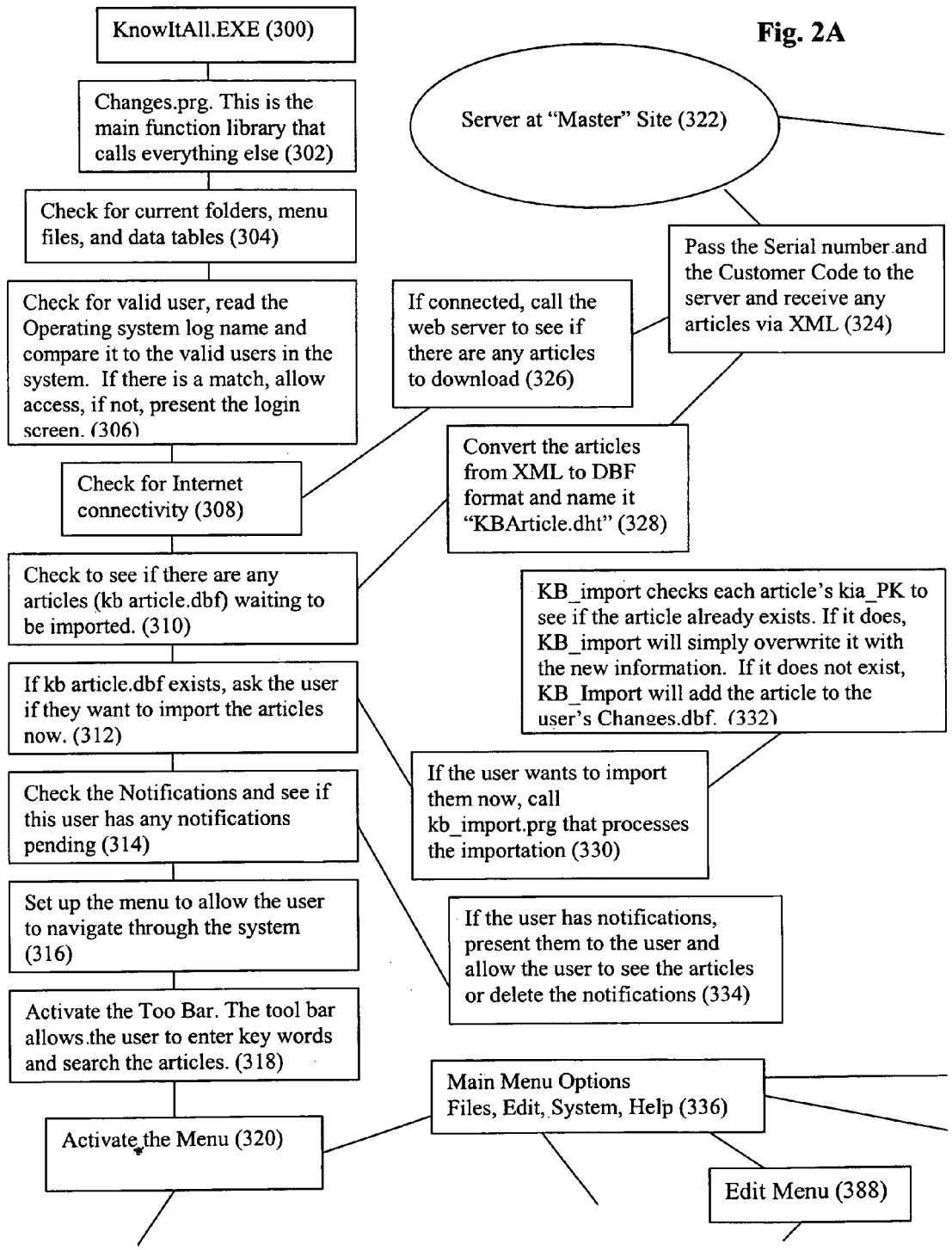
Figure 2B:
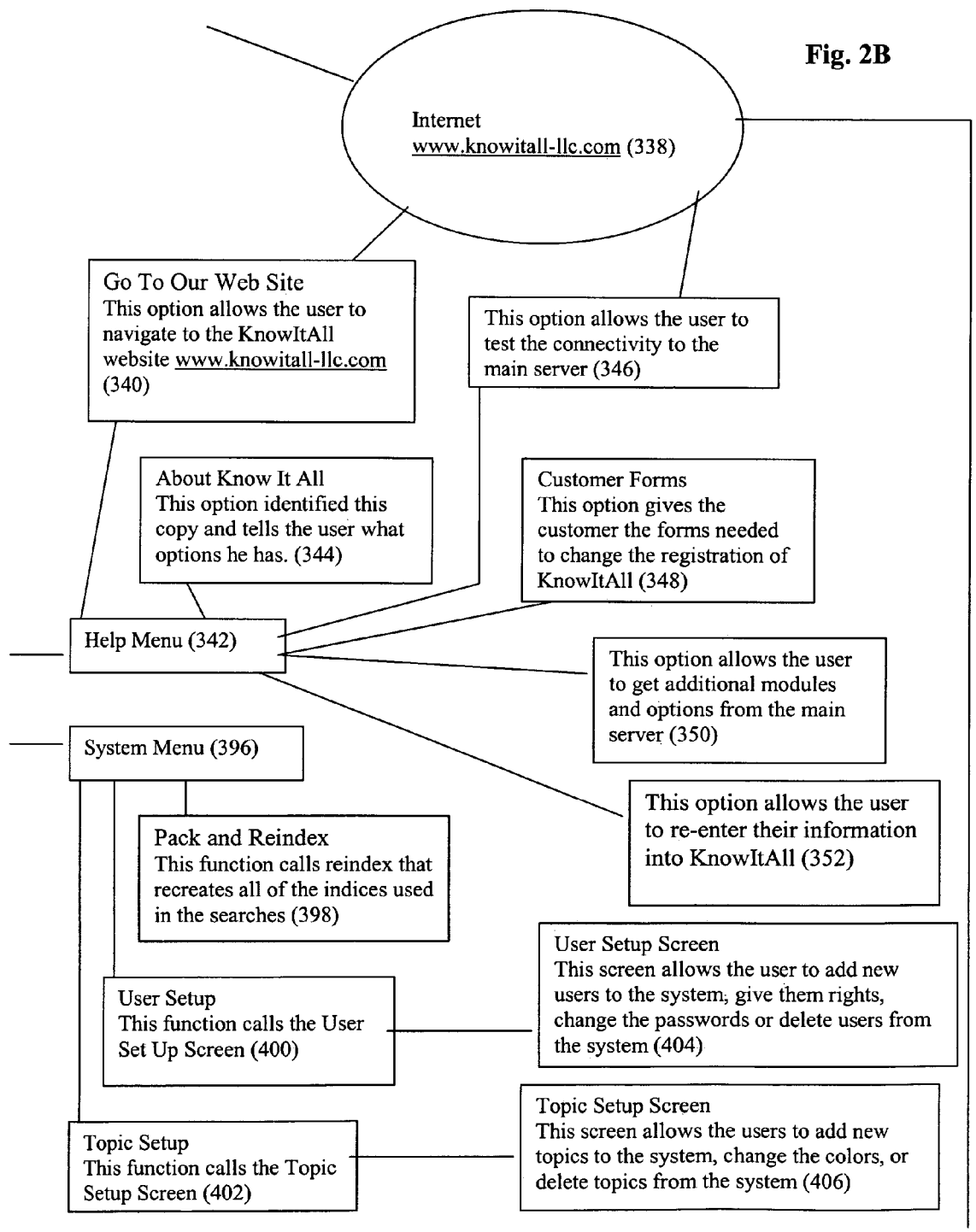
Figure 2D:
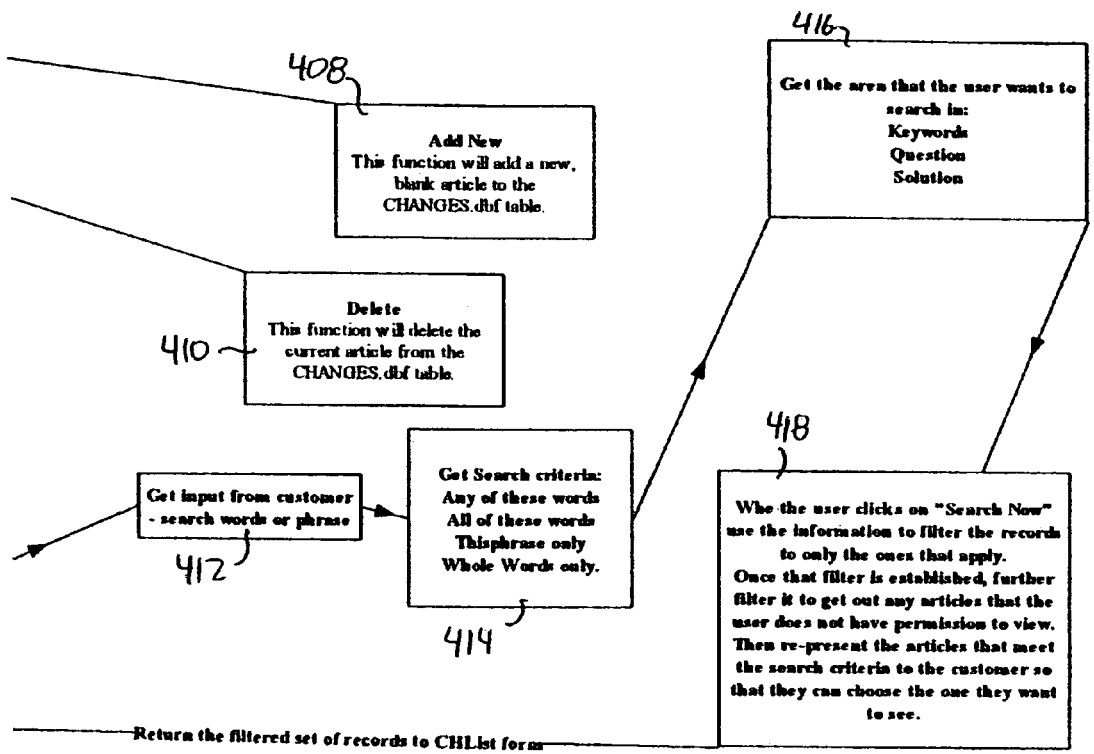
Figure 2E:
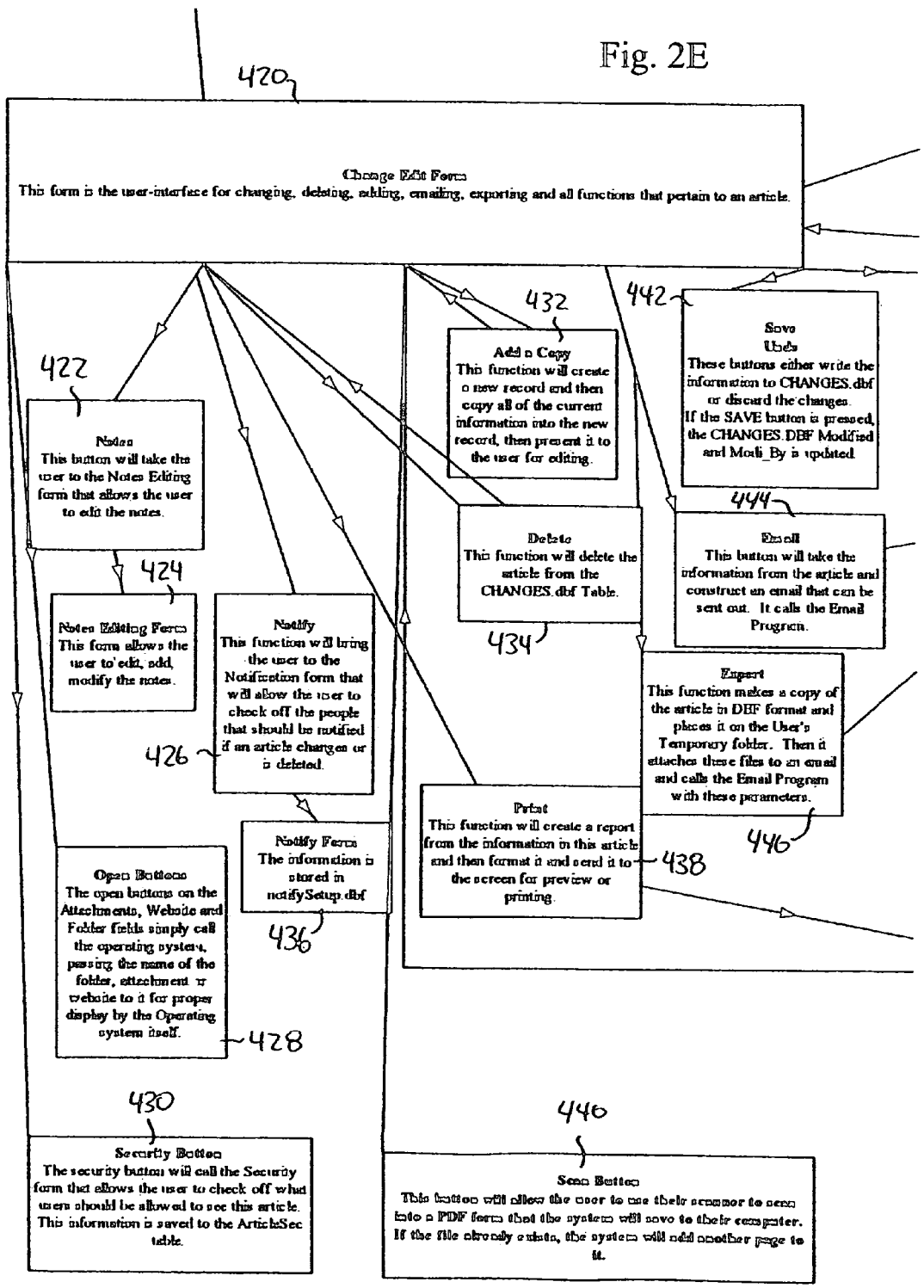
Figure 2F:
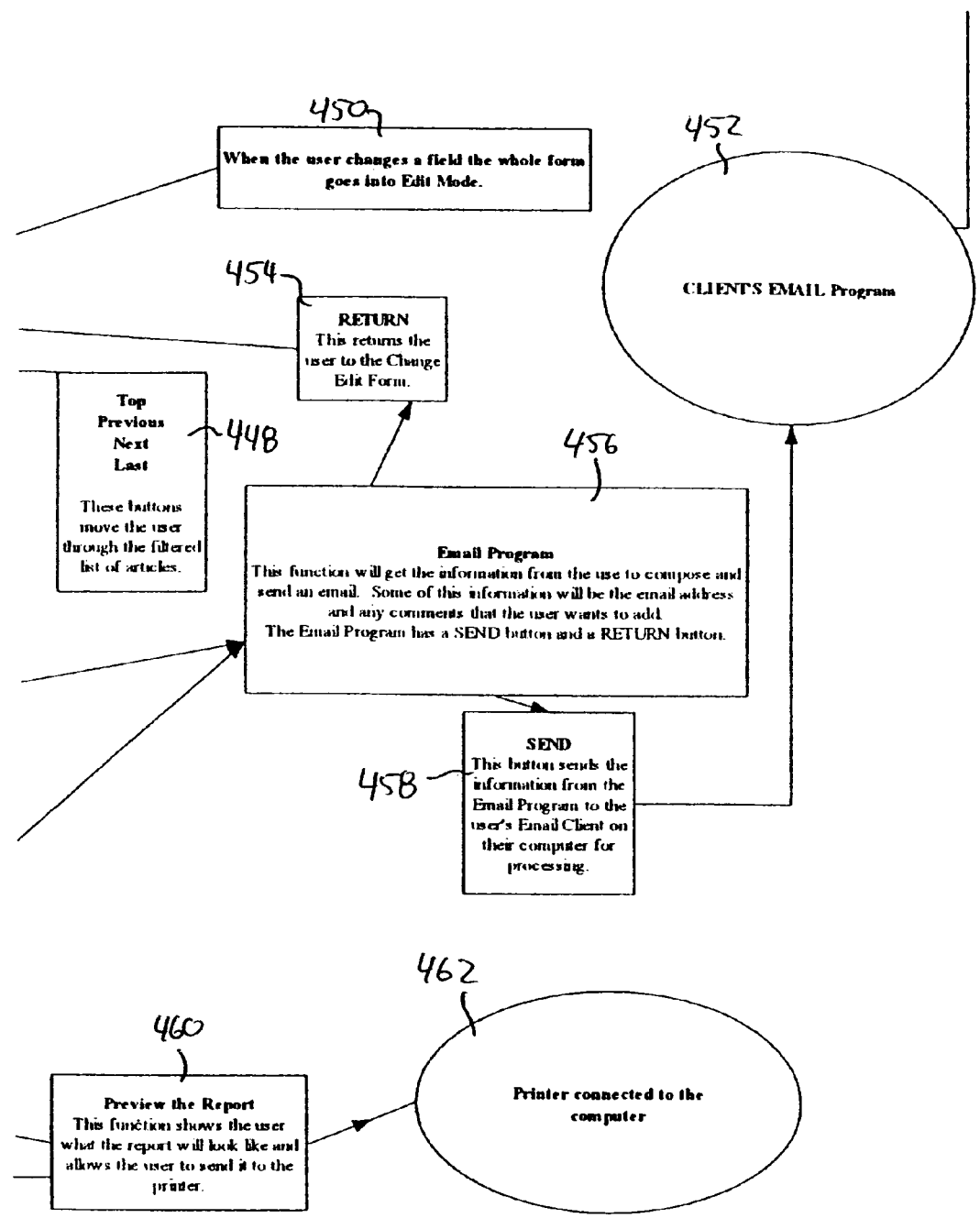

DETAILED DESCRIPTION OF CERTAIN PREFERRED EMBODIMENTS AND METHODS OF THE INVENTION

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

The terms "internal information records" and "private search space", as used in connection with embodiments of the invention, includes information and compilations of information not available for public access and use, e.g., not widely available over the Internet, such as but not limited to trade secrets.

As referred to herein, the term "search space" includes a compilation of data recorded on an electronically searchable storage medium or storage media, such as but not limited to a digital disk, hard disk, tape, server, or diskette.

Figure 17:
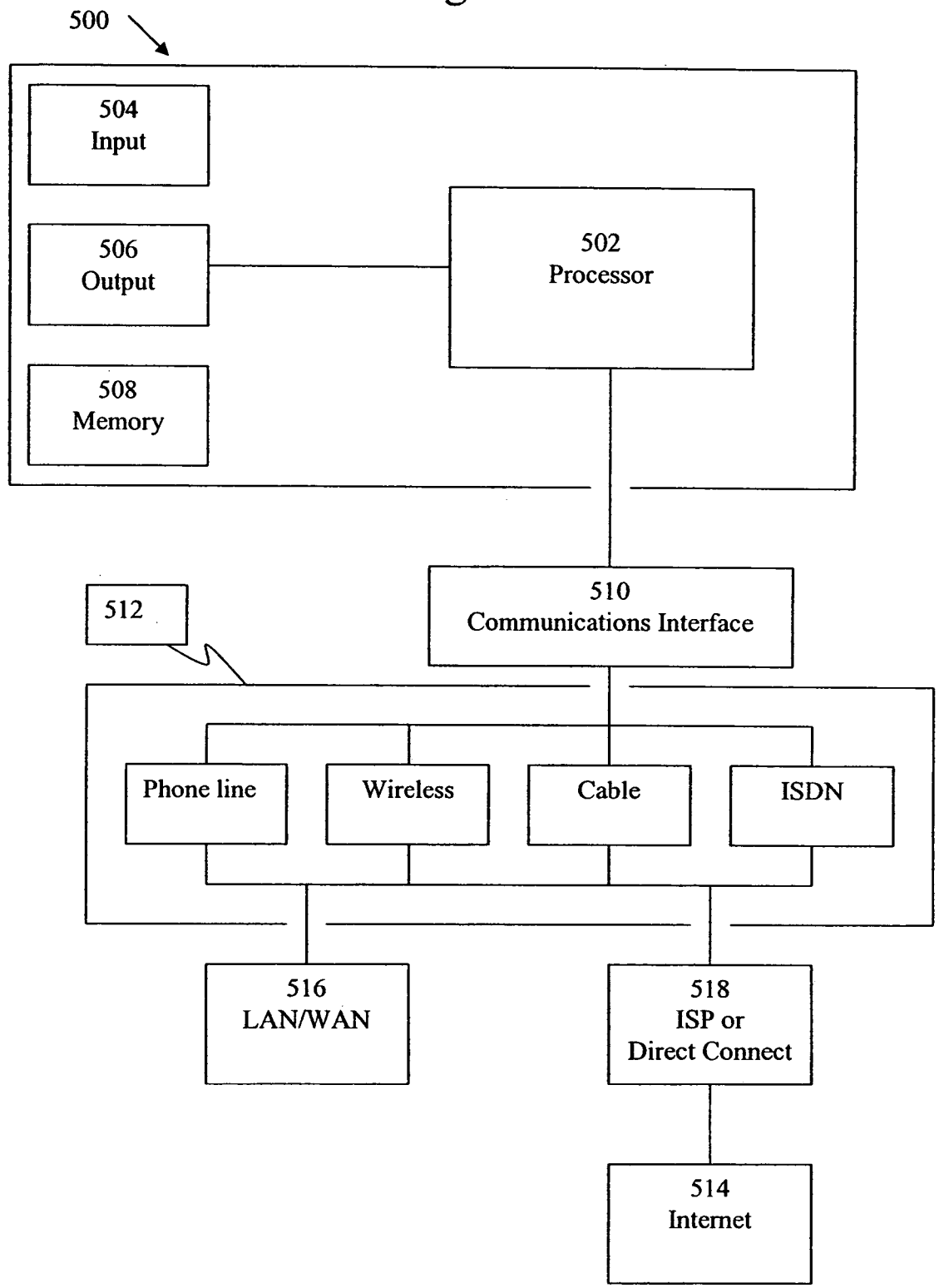
FIG. 17 is a schematic representation of a computer system of an embodiment of the present invention.

FIG. 17 is a schematic representation of a computer system of an embodiment of the present invention. The computer system comprises user interface terminal 500, which comprises processor 502, such as a personal computer with a central processing unit (CPU) processor or a system server. The CPU processor may be, for example, a PENTIUM or XEON processor from INTEL running at speeds of, for example, 300 MHz or greater, or a CELERON processor, although less or more powerful processors may be used. Other user interface terminals 500 that may be used include held-held devices, Web pads, smart phones, interactive television, two-way pagers, e-mail devices, equivalents, etc.

Processor 502 is connected electronically to input device 504 and output device 506. Input and output devices 504 and 506 may be integrated into or provided separate from processor 502. Input device 504 may be, for example, a keyboard, a numeric or alphanumeric keypad, a pointing device (e.g., a mouse), a touch-sensitive pad, a joystick, a voice recognition system, a combination thereof, and/or other equivalent or known devices. Input device 504 generates signals in response to physical, oral, or other manipulation by the user and transmits those signals to processor 502. Output device 506 preferably comprises a display screen, such as a commercially available monitor, light-emitting diode (LED) display, or liquid crystal display (LCD). Output device 506 additionally or alternatively comprises any other mechanism or method for communicating with the user, such as, for example, an olfactory, visual (e.g., printer), audio (e.g., speakers), audio-visual, or other sensory device. Depending upon the intended configuration of terminal 500, including selected input 504 and output devices 506, a sound card (not shown) and/or a video card (not shown) may be included in terminal 500.

Processor 502 is connected electronically to memory 508 for storing the computer program and records. Memory 508 may comprise any type of computer memory and may include, for example and not necessarily by limitation, random access memory (RAM) (e.g., 256 MB of RDRAM), read-only memory (ROM), and storage device(s) such as hard disc drives and storage media, for example, optical discs and magnetic tapes and discs, or combinations thereof.

In order to provide terminal 500 with expanded capabilities, e.g., for Internet compatibility, terminal 500 is preferably yet optionally provided with communications interface 510, such as network access circuitry or Ethernet network access circuitry. Communications interface 510 includes or communicates with transmission network 512, which may include any method or system for transmitting data, including but not limited to a telephone-line modem (e.g., 56 K baud), a cable modem, a wireless connection, integrated services digital network (ISDN), or a satellite modem for connecting to the Internet 514 or a local area network (LAN), wide area network (WAN) or medium area network (MAN) 516. Wireless connections include microwave, radio frequency, and laser technologies. Connections to the Internet 514 may be made directly or through Internet Service Providers (ISPs) 518.

Communications interface 510 and transmission network 512 permit user interface terminal 500 to communicate with remote data source(s) and/or server(s) 512, including databases, for example, for retrieving linked data, as discussed in further detail below. The communications interface also provides the option of using terminal 500 of the present invention as a standalone terminal or as a "dumb" terminal where the CPU processing is done remotely, e.g., at a server or central computer terminal.

According to an embodiment of the invention described herein, an information management and retrieval computer program and method useful in/with system 500 are provided for allowing a single user or multiple users to find, edit, share, retrieve, and otherwise manage internal information records. The computer program and method of embodiments of the invention described herein are useful in home, personal, and business environments. Various types and kinds of internal information may be managed as records, including, for example, documents, bits of information, procedures, website addresses and passwords, folders, personnel information, contacts, etc. In the context of personal usage, the computer program and method may find usefulness in management of records relating to home repair, personal finances, photo albums, and the like. Business usage of the computer program and method may involve management of information relating to office procedures, sick leave and other personnel records, employee projects, client contact information, outside vendor account information, to name a few examples. Management protocols embodied herein permit usage of the computer program and access to a particular search space (e.g., database or databases) by a single user or multiple users.

According to a preferred embodiment of the invention, the computer program is loaded on user interface terminal 500 in known manner. For example, the computer program may be loaded from a transportable memory medium, such as a CD-ROM, by loading the medium into a suitable drive, e.g., a CD-ROM disc drive of the computer. Alternatively, the computer program may be downloaded over the Internet. Other loading techniques not discussed herein but otherwise known in the art or suitable may be employed. The computer program preferably contains an automatic start-up and loading sequence, as is known in the art. In the event that the computer program is to be used by multiple users, it may be loaded individually on each terminal 500, or the program may be installed on the server or a shared hard drive, such as an "M:" drive from which various users can access the program from their workstations.

Preferably, once installed onto user interface terminal 500, server, or shared hard drive, the user can register the computer program software, preferably using the Internet. Registration and communication over the Internet may be used for sending product updates and the like to the user. In this regard, for example, the present invention permits a Master Copy of the computer software saved on the provider's server to remain in communication with the copies of the software purchased by the subscribers. This feature allows the Master Copy to download updated articles, data, and other information from the server to the subscriber. The provider may divide its subscribers into "groups" to facilitate downloading of records and other information. A particular subscriber may be a member of one or more of the "groups".

Upon installation, the program preferably provides an icon on the computer desktop, or each computer desktop in the case of multiple users. Double-clicking of the icon opens the program for use, allowing access to a home or main screen, depicted in FIG. 3. From the main screen, the user can perform various functions described below, including record viewing, adding, editing, searching, and retrieval.

Referring to FIG. 3, a user interface screen representing an embodiment of a computer program of the invention and suitable for carrying out embodied methods of the invention is shown. The user interface screen depicted in FIG. 3 is the home or main screen. In the illustrated embodiments, multiple internal information records (or "articles," as referred to several of the figures, hereinafter referred to as "records" in the interest of brevity) of a search space (e.g., database) are listed in a grid or table format. It should be understood that while not shown, other arrangements or formats of records are possible. The table includes the following field headings: Topic; Open, Question/Title; Solution; Date; Sequence, Views; and Attachment.

Figure 4:
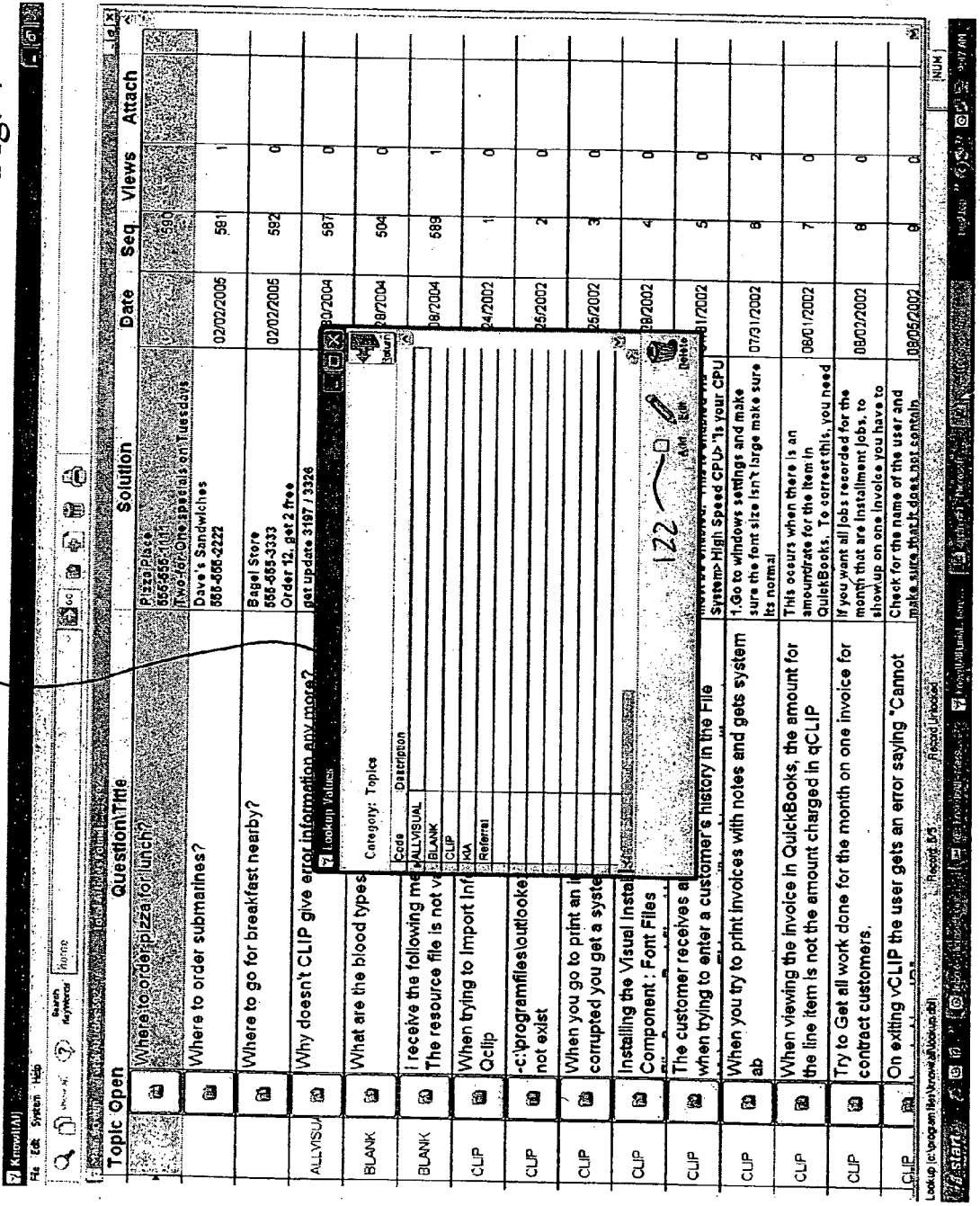
Figure 5:
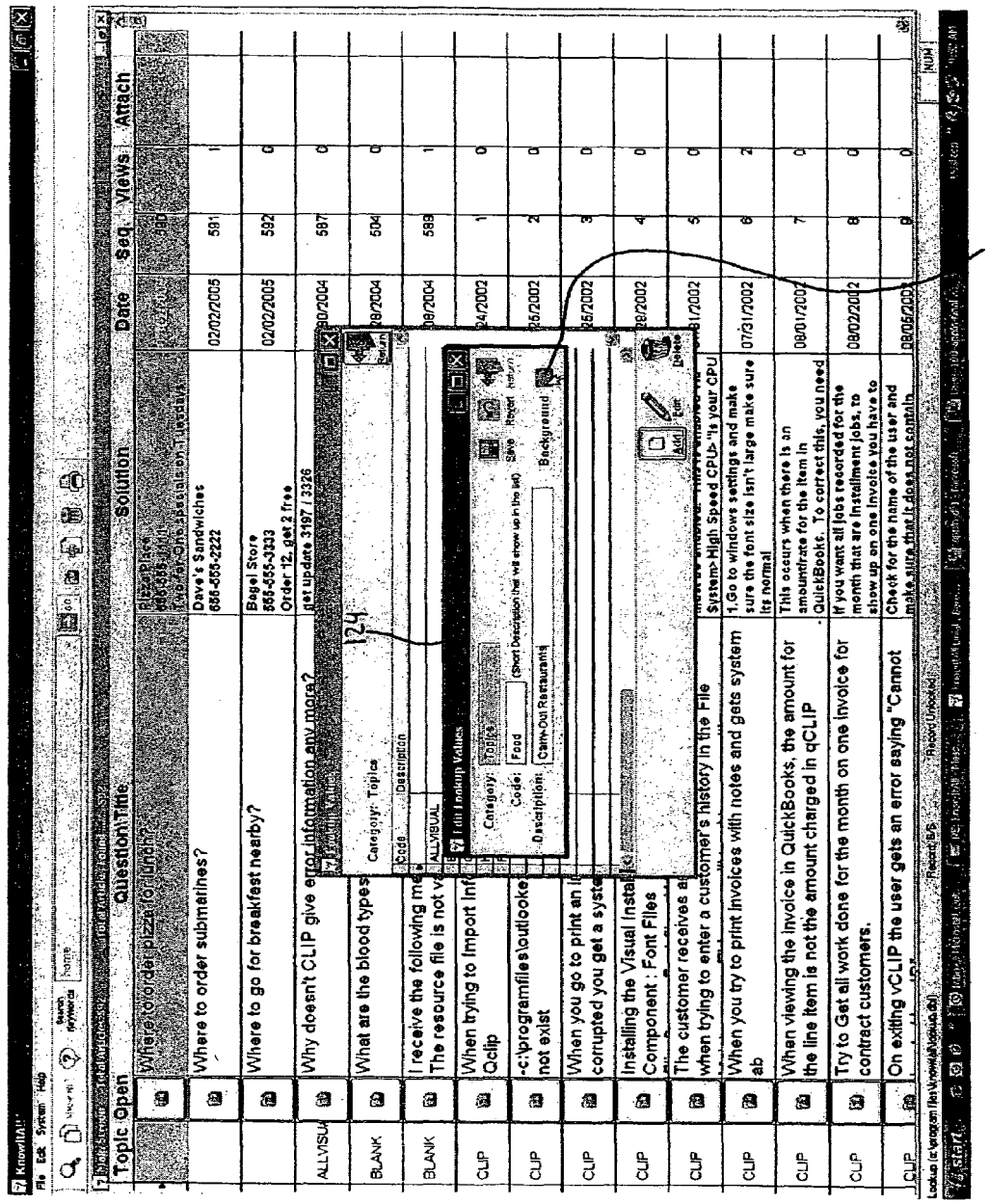

The "Topic" field may be used to categorize the records, such as according to subject matter that each record relates to. Although not apparent from the figures, the color of the topics headings may be changed to readily identify topics that are grouped together by color, e.g., a distinct color for each topic. Topics may be added and removed using the "System" pull-down tab and selecting "Topic Set-up". FIG. 4 shows the resulting dialog box 124 for editing topics. To add a topic, "Add" icon (also referred herein as a button) 122 is selected, bringing up dialog box 124 shown in FIG. 5. Selection of "Background" icon 126 permits colors to be assigned and edited.

Selection of the "Open" field for a given record opens the record for viewing and editing. Alternatively, a record may be opened by double clicking on any field in the record, or by selecting the field and clicking on open button 110 (FIG. 3).

The "Question/Title" and "Solution" fields provide a quick reference and summary of each record. As evident from the headings names, the "Question/Title" is selected to describe the information in the record by an intuitive question or by subject matter. Likewise, the "Solution" field is provided with a brief answer to the question or solution offered by the record. According to a preferred embodiment of the invention, a record having a completed "Question/Title" field but lacking information in the "Solution" field is highlighted (e.g., in bold or a different color, such as red) or otherwise distinguished and/or reported to the user. In instances in which multiple users are using the computer program, this feature permits a user to disseminate a question to other users of the computer program. When the user enters the record without information in the "Solution" field, the record will show up on other user's screens, allowing the other users an opportunity to answer the question and to disseminate the "Solution" not only to the querying user, but to all users of the computer program having access to the record. A listing or report of unanswered questions may be created by using the mouse to click icon 104 (FIG. 3). The "File" pull-down tab at the top of the screen of FIG. 3 includes an option for viewing notifications.

Returning to FIG. 3, the "Date" field provides the month/day/year on which the record was made. The "Sequence" field provides a number representing the sequential order in which the records were created. The "Views" field represents the number of times the record has been viewed by users. Finally, the "Attachment" field indicates whether a document or other attachment has been attached to the record. The records may be sorted by alphabetically by "Topic" or "Solution", or sequentially by date, sequence, or views by clicking on the topic heading with the mouse. For example, selection of the "Date" heading will sort the records chronologically according to the order in which the records were created.

Figure 6:
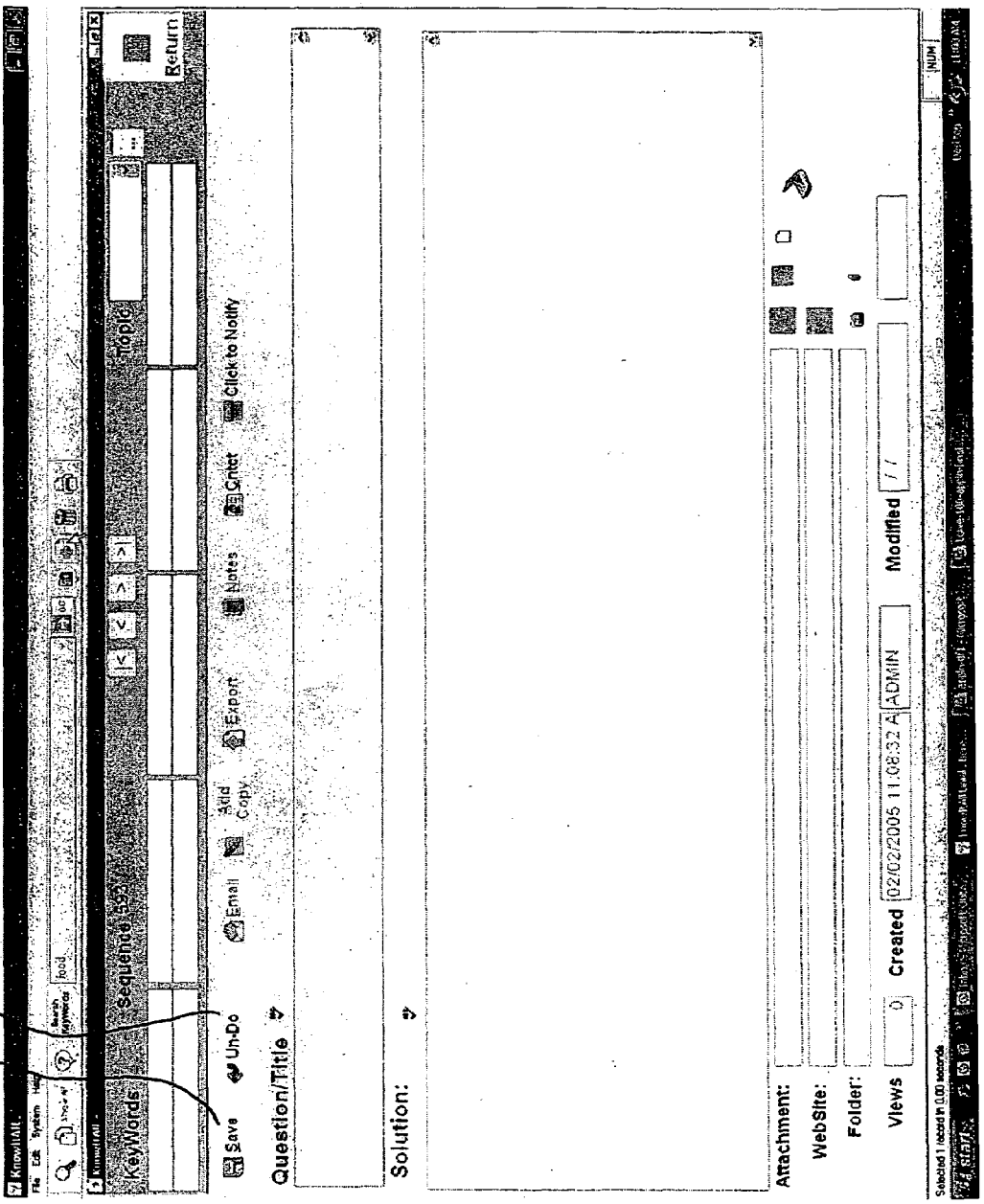

New records may be added to the database in several different ways. For example, addition sign "+" icon 112 (FIG. 3) is selected using a mouse to bring up an empty record, as shown in FIG. 6. Also, the "File" pull-down tab at the top of the screen of FIG. 3 includes an option for adding new records. Once an empty, new record is opened, the various data fields may then be entered, as discussed in greater detail below. Adjacent icons 114 and 116 (FIG. 3) cause a selected record to be deleted and printed, respectively.

Figure 7:
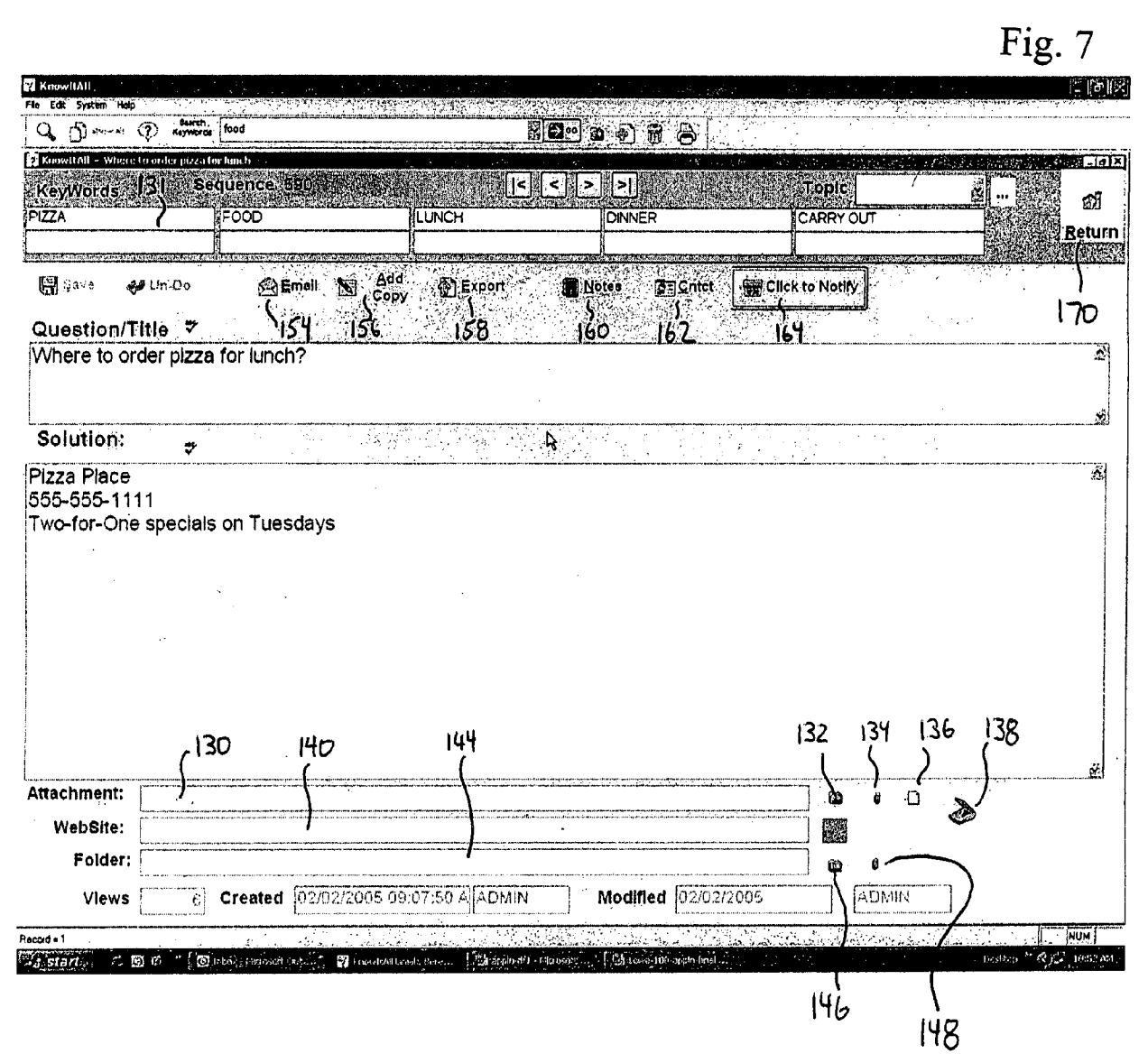

FIG. 7 illustrates a user interface screen of an existing, open record. As mentioned above, a record is opened by clicking on the "Open" button corresponding to the record, by double-clicking on any field of the record, or by selecting a record and clicking icon 110. Located at the top of each record is a plurality of distinct keyword fields 131 for entry of up to ten (10) keywords. It should be understood that the source code may be modified to include fewer or more keyword fields 131. The keywords preferably are words, numbers, or alphanumeric characters having relationship, such as an intuitive relationship, to the record subject matter for facilitating searching and retrieval of the record. For example, the record shown in FIG. 7 relates to a local pizzeria from where lunch may be ordered. The keywords include terms intuitively related to the subject matter, e.g., pizza, food, lunch, dinner, carry out. As explained in detail below, these keywords are useful in conducting record searches.

Figure 8:
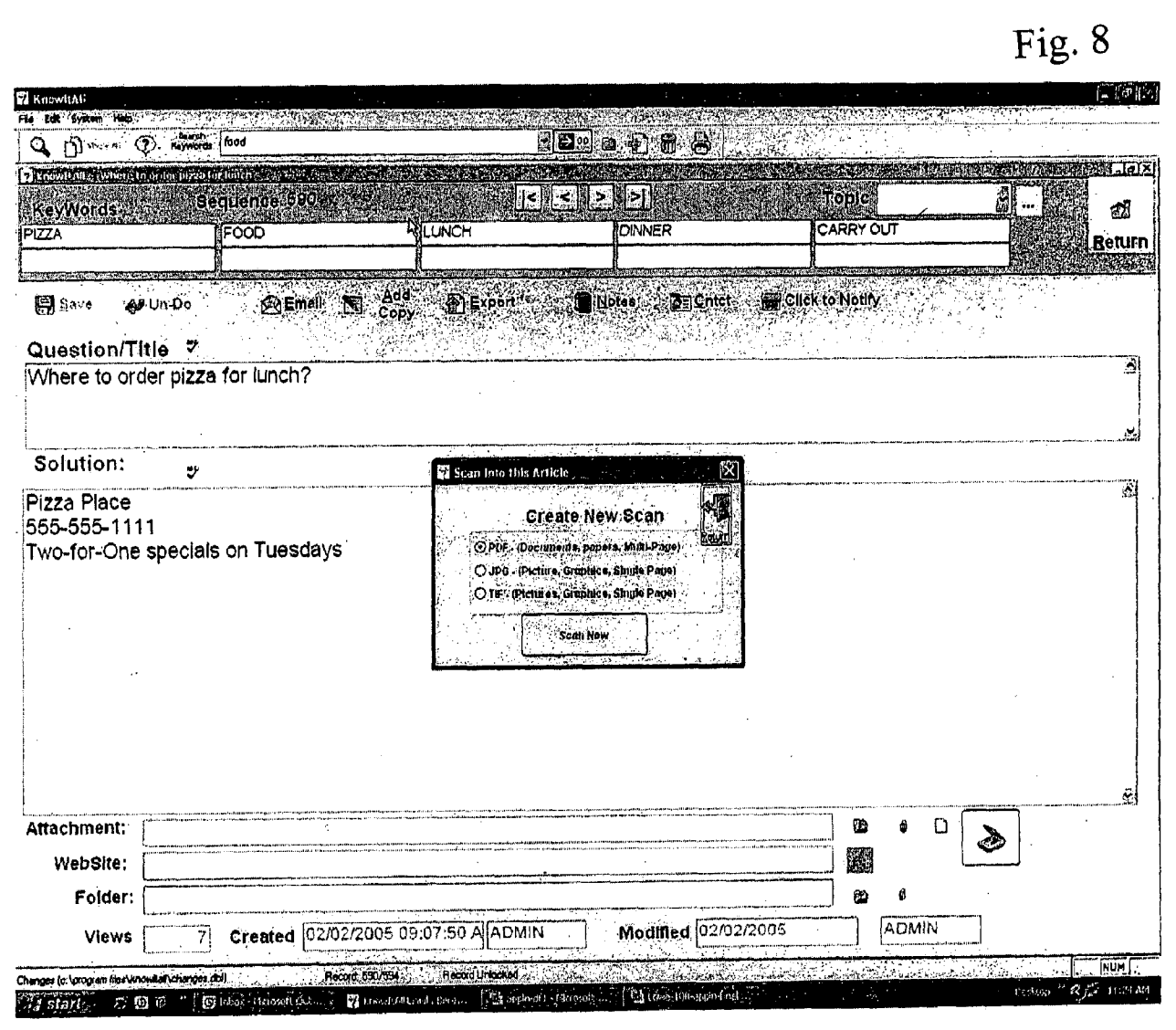

The computer program permits attachment of a document to a record. Attachments are especially useful for linking a record to relevant information contained in the document. Various types of attachments are permitted. For example, to attach an existing electronic document to a record, the path to the electronic document may be typed into "Attachment" field 130, shown in FIG. 7. Alternatively, paperclip icon 134 next to "Attachment" field 130 is clicked to bring up a folder and document listing from which a document may be selected for attachment. Linking the electronic document to the record negates the need to keep track of the location of the document on the computer hard drive using a tree structure. Editing a document recalled with a record is performed easily by clicking edit icon 132. Upon completing the edits, the edited document will immediately become available to other users having access to the document. An existing paper or physical document may also be attached to a record by selection of scanner icon 138. As shown in FIG. 8, a dialog box is opened that permits the user to select the scan format of the document, e.g., in PDF, JPG, or TIF format. The use of PDF format is particularly useful for saving a single document containing multiple pages, such as contracts, photo albums, correspondence, manuals, etc. It is within the scope of the invention to modify the computer program to accept other scanning formats. Scanning documents into electronic format substantially reduces paperwork, and linking the electronic files to corresponding records facilitates document retrieval. Document attachment also may be accomplished by clicking icon 132, which permits the creation of new documents from scratch using an available program, e.g., in MicroSoft Word, Excel, PowerPoint, Publisher, etc., for attachment to the record.

Internet website addresses also may be attached or linked to a particular record. Linking of a web address may be accomplished by entering the web address into the website field 140 shown in FIG. 7. Alternatively, a website address may be linked to a record by typing the website address in the "Solutions" field of the open record. The website is then accessed by striking the control button on the keyboard while the website is highlighted. A message is sent to the operating system to activate the browser.

"Folders" field 144 and icons 146 and 148 located further down the open record user interface screen links a particular record to a file folder of the database, e.g., a file folder found in a logic tree. All files in the particular file folder are thereby linked to the record. Pressing the file folder button instructs the operating system to open the folder and present its contents to the user.

Returning to FIGS. 6 and 7, a plurality of icons or buttons immediately below the keyword fields 131 provide additional record management operations. Starting with the icons on the left side of the user interface screen of FIG. 6, "Save" icon 150 and "Un-do" icon 152 permit the record to be saved and edited, respectively. (Other editing operations are available using the "Edit" pull-down tab at the top of the main screen.) "E-mail" icon 154 shown in FIG. 7 permits the user to send the record via e-mail to a recipient, preferably using an available program such as MS Outlook. "Add/Copy" icon 156 permits the user to create a new record identical to an existing record. The user is then permitted to edit fields of the new record, as desired, while retaining copied fields that are applicable to the new record. Creation of new records using the "Add/Copy" icon facilitates record input by allowing repetitive field information to be copied between existing and newly created records.

Figure 9:
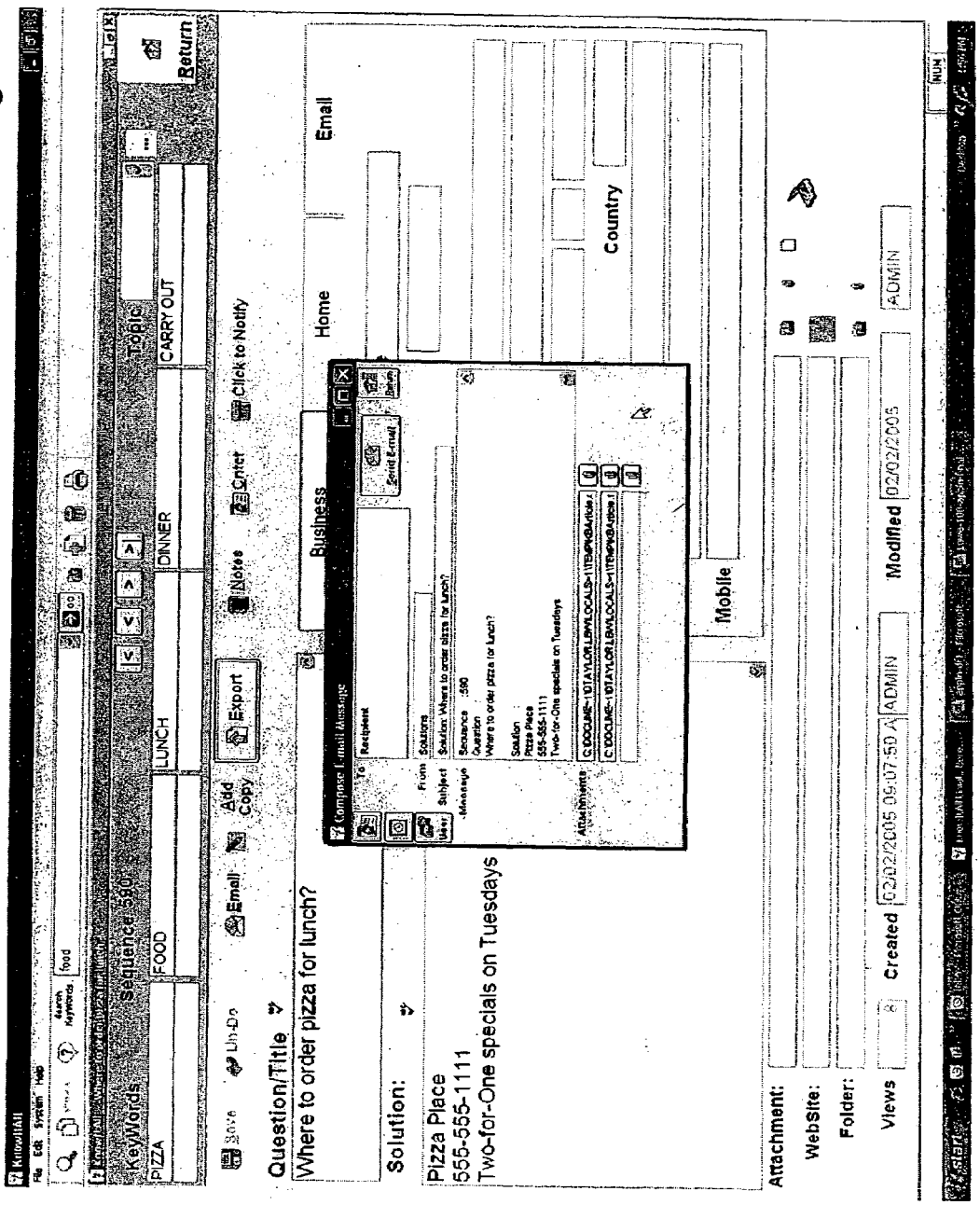

To export a record, a user clicks export icon 158 (FIG. 7) to create an email having two attached files. The files may be saved to disc upon arrival at the destination. The user can later import the files from the main screen into their system. The user interface export screen is shown in FIG. 9. The sequence numbers are used to ensure that like files are not duplicated. For example, if a record is exported from a business to a user's home as a home copy, a new record (or "home record") is created at the user's home. If the original record at the business is later edited and re-exported to the user's home, the computer software will update the superseded home record instead of re-creating a separate, new home record.

"Notes" icon 160 opens up a notebook page in which the user may enter notations, thoughts, and other information in a separate field linked to the record.

Figure 10:
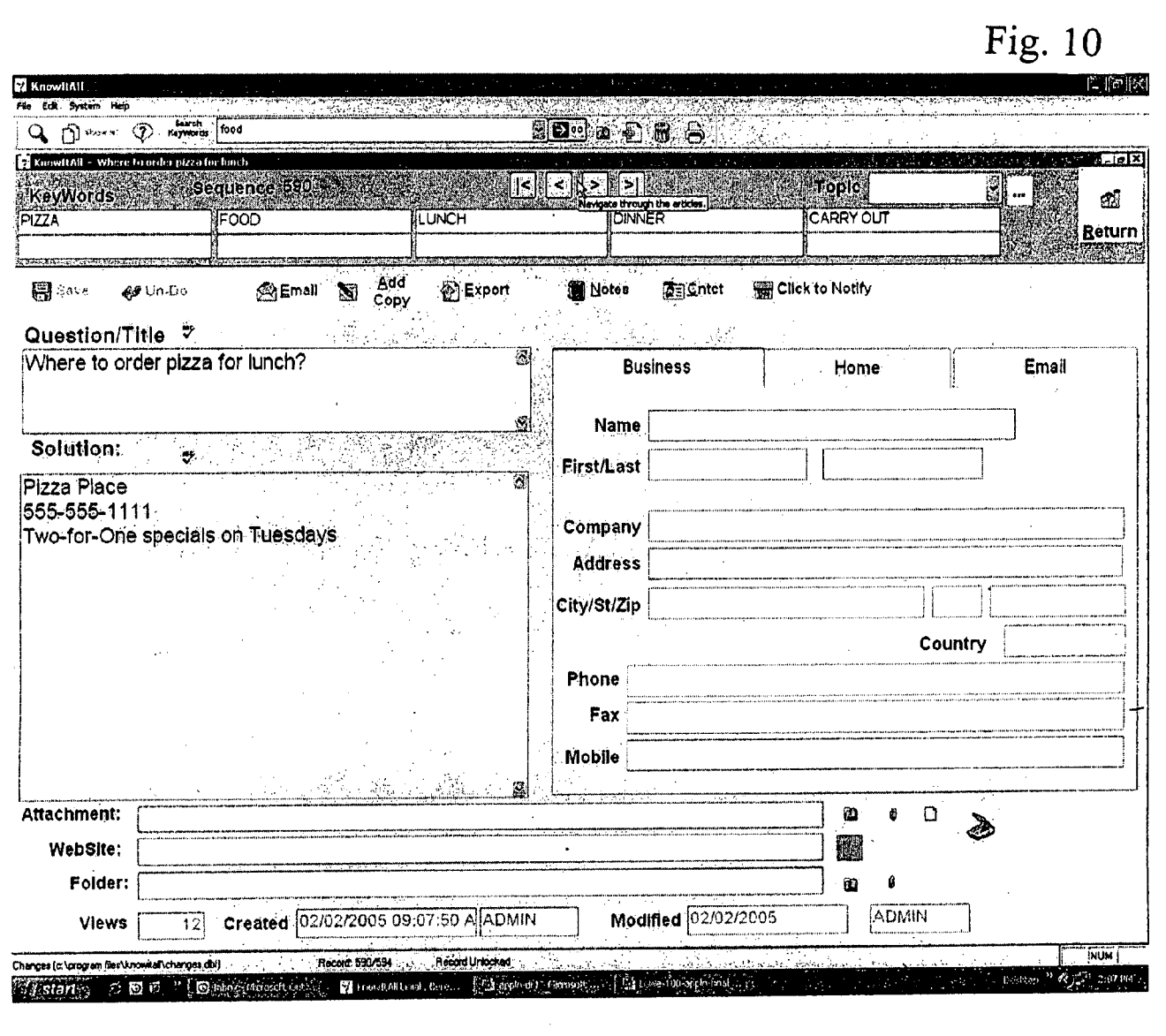

Entry of contact information for a record is accomplished by selection of "Cntct" icon 162 (FIG. 7), which opens up contact information entry fields, shown in FIG. 10. Contact information entry fields include normal contact information, such as home and business addresses and phone numbers, and email addresses. By compiling multiple records with contact information and assigning a common keyword (e.g., "rolodex", "contacts") in a keyword field of each record, the records saved in the computer program may serve as a searchable address book.

Figure 15:
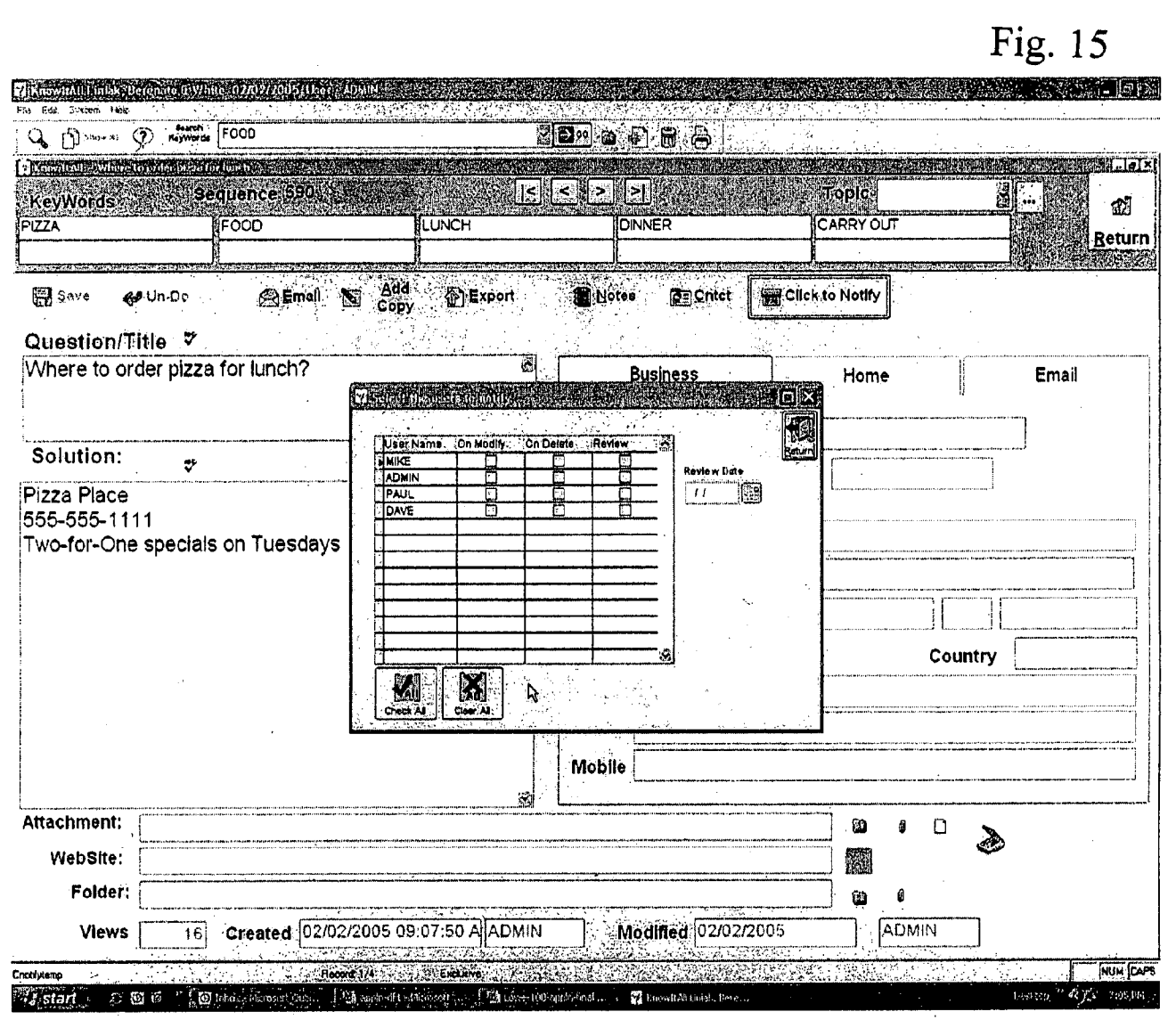

The "Click to Notify" icon 164 (FIG. 7) appearing in the record screen permits a user to bring a specific record to the attention of the user or another user when the record has been modified, deleted, or requires review. As shown in the dialog box depicted in FIG. 15, the user may check the "On Modify" box to automatically notify himself (or herself) and/or another user or users when the record has been modified. The "On Delete" box is checked to notify the user and/or another user or users when the particular record has been deleted. Finally, the "Review" box is checked to bring the record to the attention of the user and/or another user or users on a specific date, entered in the "Review Date" box, for review. The "Click to Notify" operation is especially useful for keeping a particular user or users apprised of edits to a record that is vital or otherwise significant to the user(s).

To close the record and return the user from an individual record screen to the main screen, the "Return" icon 170 located and the upper right-hand corner of the open record (see FIG. 7) is selected with the mouse.

Figure 11:
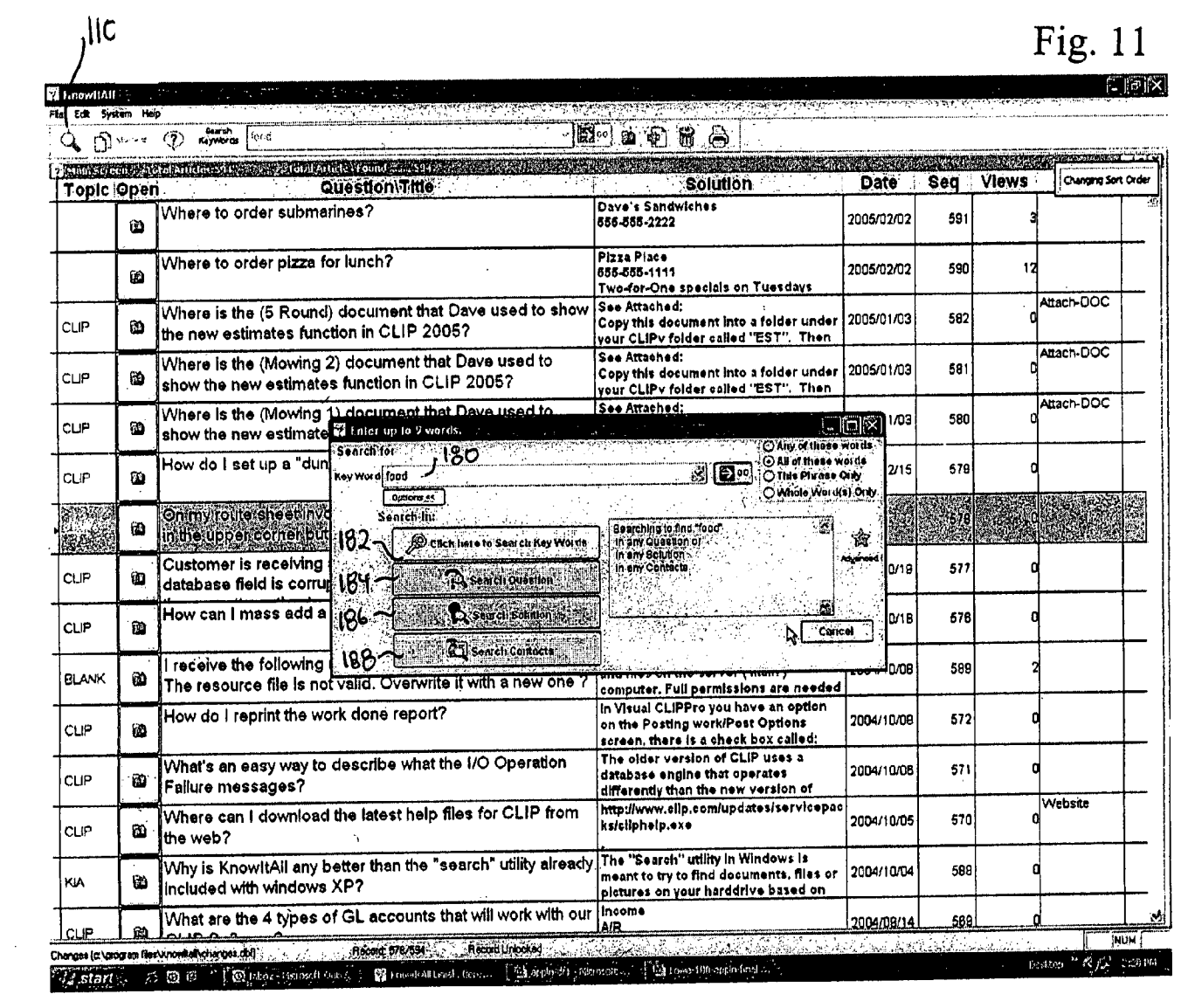

Searching of the records database is performed by entering a search term or terms into keyword search field 106 on the main screen, and clicking "Go" icon 108 or striking the return key on the keyboard. The computer program searches for keyword fields 131 of records for keywords matching the search request in search field 106. In its current version, the software permits searching of up to nine (9) search terms, although it should be understood that software modifications may be made to permit searching of a fewer or greater number of search terms. For additional search options, the user may select search icon 100, which will bring up the search dialog box shown in FIG. 11. Once the search icon 100 is selected, the following four search technique options are made available to the user: (1) "Any of these words" searches for records containing any one of multiple search terms entered into the keyword search field 106; (2) "All of these words" searches for records containing each and every search term entered into the keyword search field 106; (3) "This phrase only" searches for records containing a phrase identical to the phrase entered into the keyword search field 106; and (4) "Whole word(s) only" searches for whole words in the record that match the search term(s) in the keyword field 180. Search options also permit narrowing of the search to specific record fields, and in particular the keyword, question, solution, and contact fields by clicking of buttons 182, 184, 186, and 188, respectively.

Figure 12:
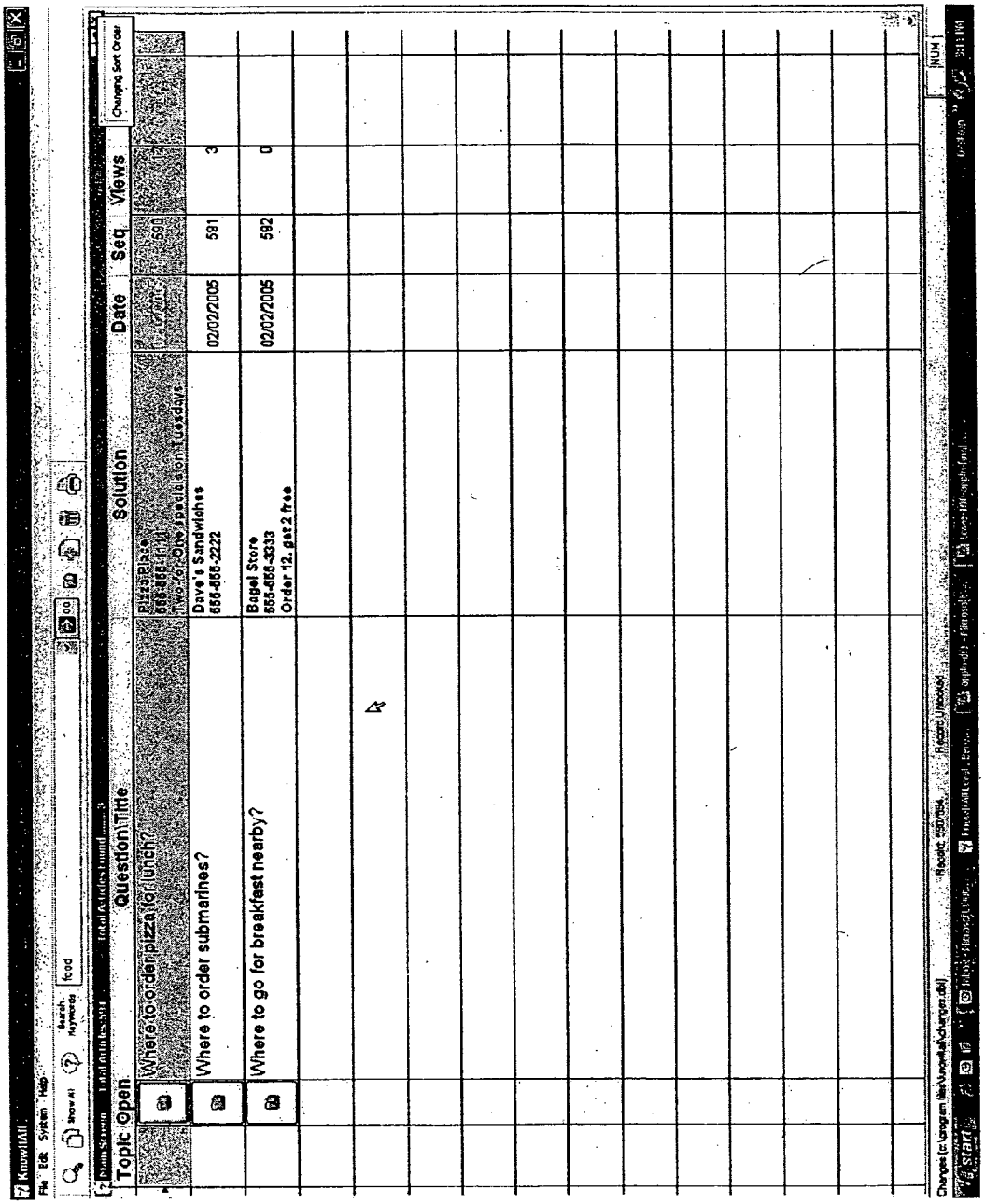

FIG. 12 illustrates a user interface screen having the results for a keyword search of the term "food." The search results include three records containing "food" as a keyword. The search may be further focused within the search results by entering an additional or different search term in the keyword search field 106. Once the search has been completed, the user may recall the entire database by clicking on "Show All" icon 102 (FIG. 3).

Figure 13:
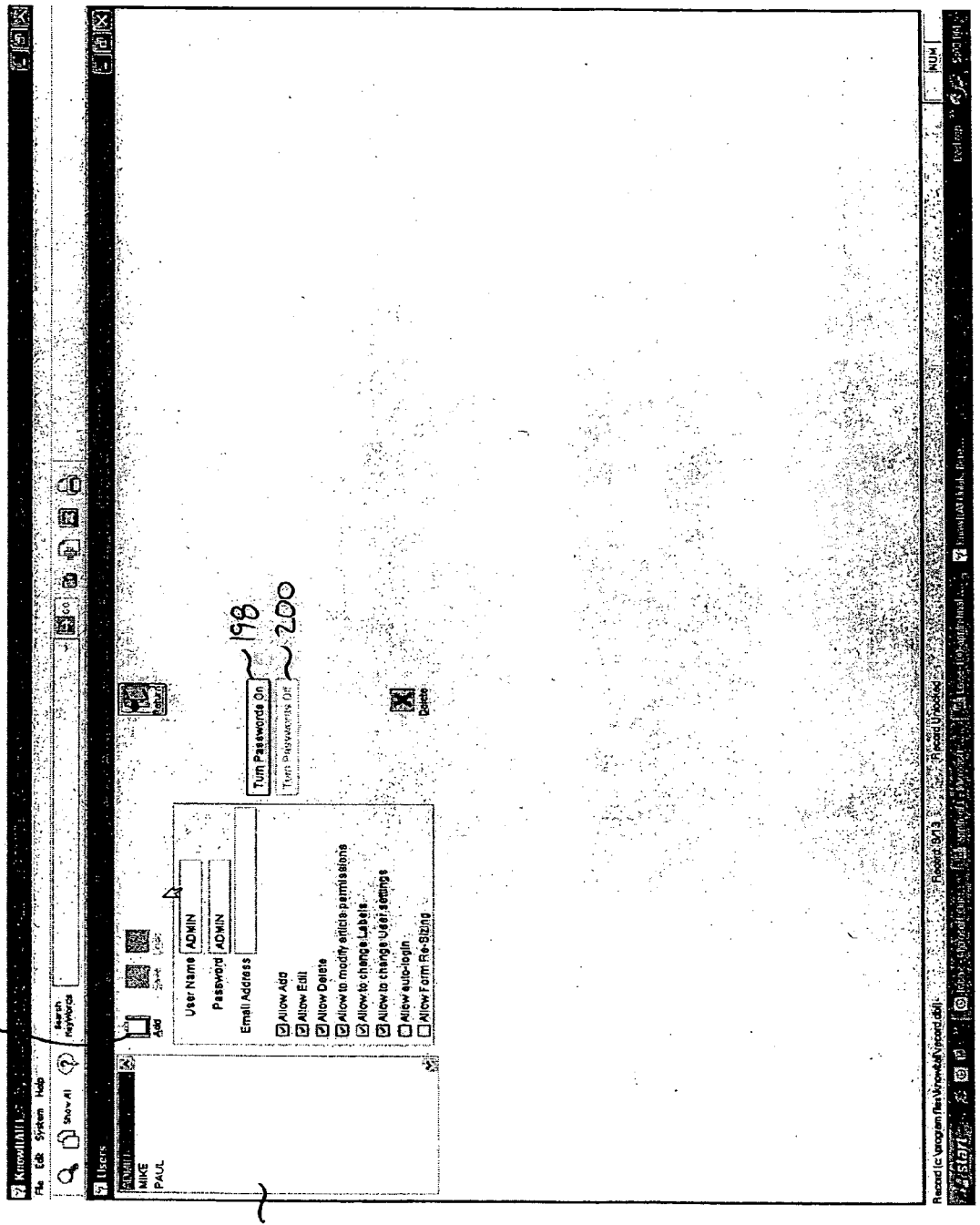
Figure 14:
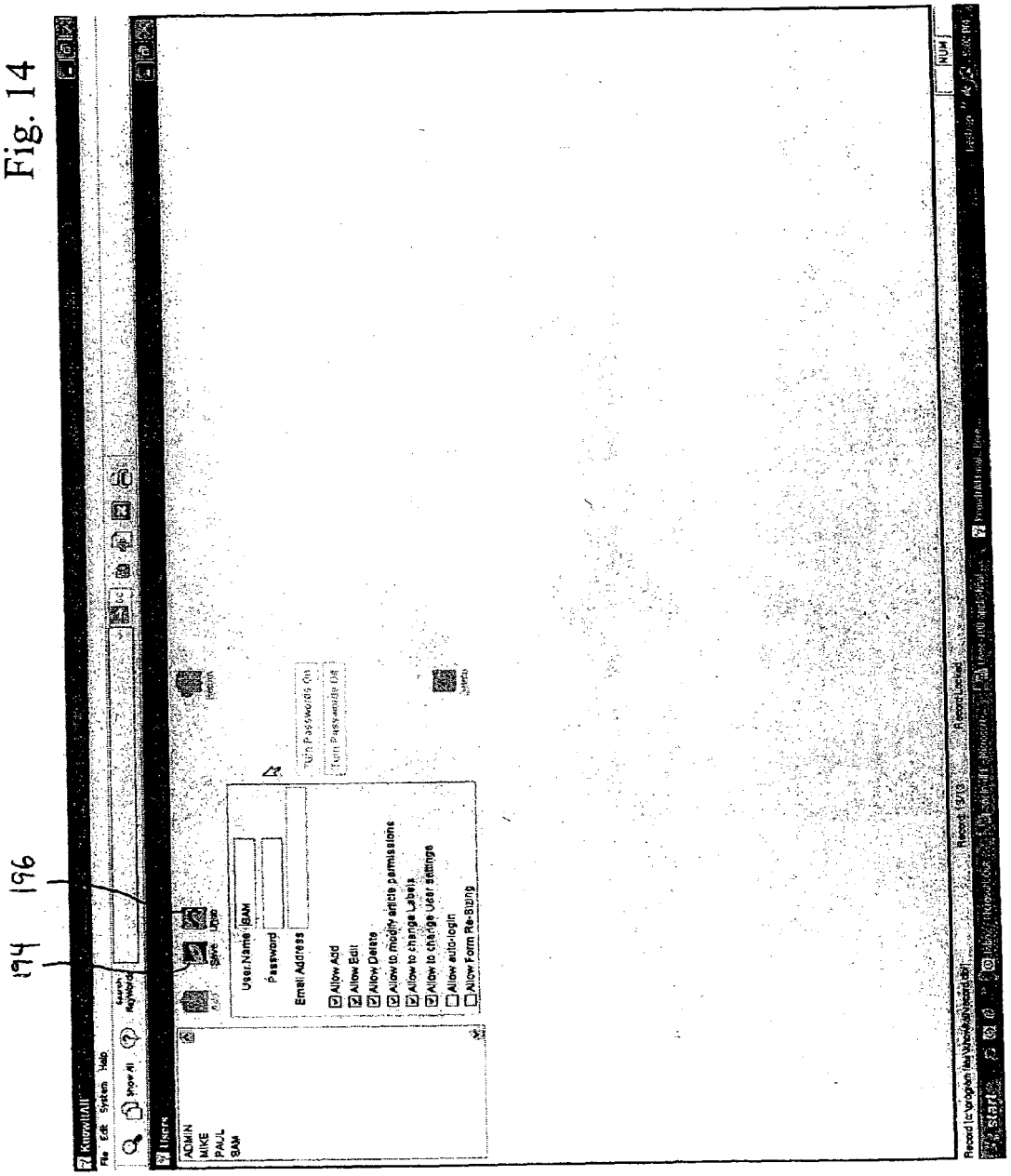

The embodied computer program and method include a security system. The security system is accessed via the "User Setup" file of the "System" pull-down tab on the main screen. FIGS. 13 and 14 illustrate a dialog box of the security system. The dialog box of FIG. 13 includes a user list 190 containing all of the registered users for the database. To add a new user, the system administrator clicks the "Add" icon 192, and a new user name and password are entered into the appropriate fields, as shown in FIG. 14. According to an embodiment, the security system provides the system administrator with security restriction authority for granting or denying users permission to execute record management operations on the electronically recallable internal information records. Permissions may be granted for each user on either a record-by-record basis by controlling user access to individual records, as described below. Record management operations include such activities as adding a new record, viewing and editing an existing record, attaching a document to a record, modifying record permissions, changing labels, changing user settings, allowing auto-login (explained in further detail below), and other operations described herein. The "modify record permissions" essentially permits the system administrator to delegate authority to control permission usage. Upon selecting "Add" icon 102, the system administrator is given the option of copying permissions from an existing user to the new user. The system administrator then either clicks on "Save" icon 194 to save the new user and selected permissions, or "Undo" icon 196 to delete the new user prior to saving.

The security system is optionally provided with an auto-login feature, which is activated by clicking the "Turn Passwords Off" icon 200. When activated, the auto-login feature allows a user to log-on to the computer program if the user name saved in the program matches the Windows user name logged into the work station. The auto-login feature is deactivated by clicking the "Turn Passwords On" icon 198. According to an embodiment, once the passwords system is turned on, the computer program defaults to permitting each user access to all records.

Figure 16:
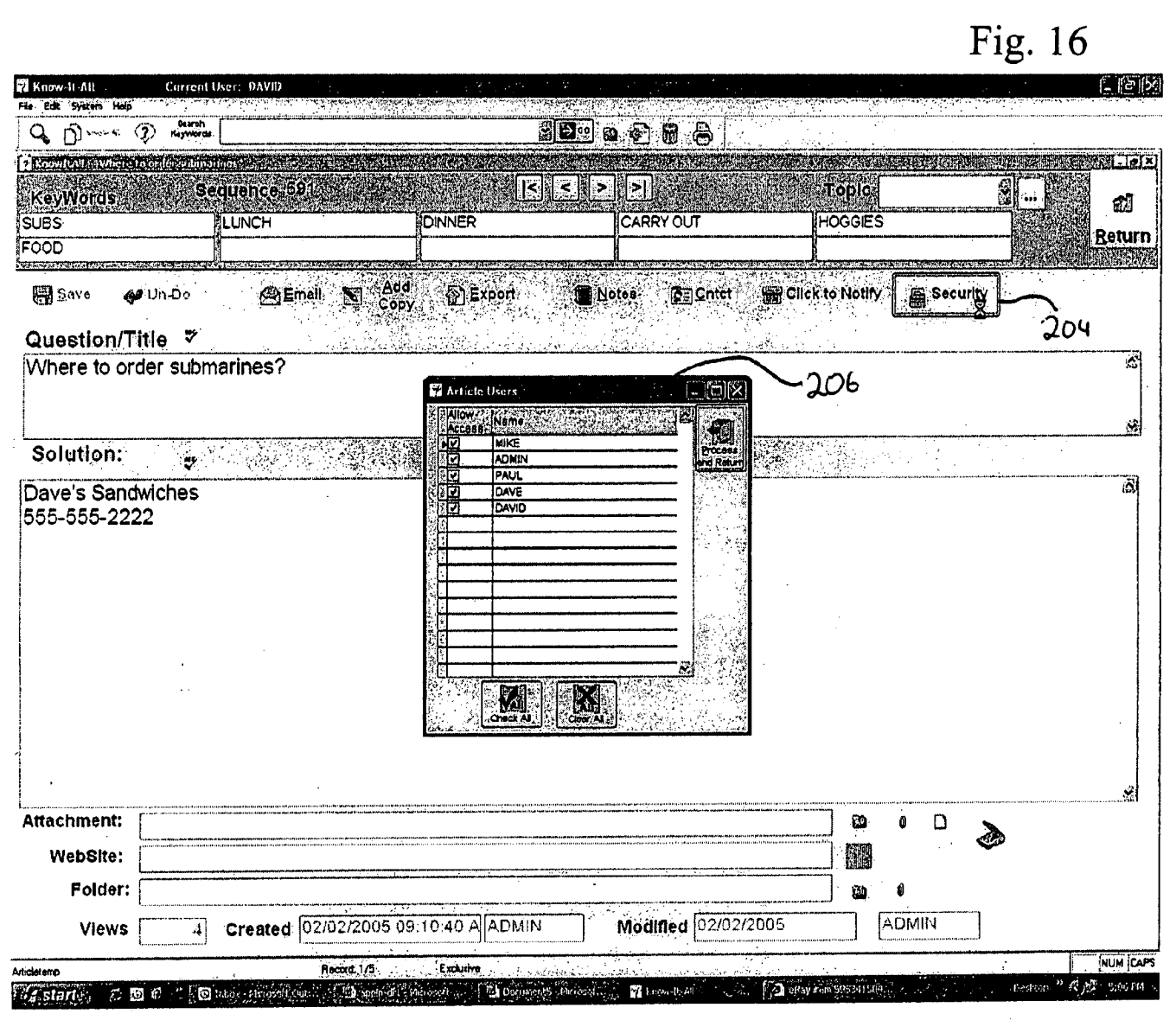

The security system of the embodied computer program is capable of individually assigning different security setting to different records. This feature is activated by turning on the password function, which is accessible via the "User Setup" file of the "System" pull-down tab. See FIG. 13. When the password function is activated, users possessing appropriate permissions will have security icon 204 appear on the record screen, as shown in FIG. 16. Clicking on security icon 204 brings up security dialog box 206. The user can then check or uncheck access boxes next to each user name to respectively allow and deny access (and record management operations) to the record.

The logic flow of the computer program embodied above will now be explained with reference to FIGS. 1 and 2A through 2F. Upon opening the computer program 300, the program performs a system check (e.g., of folders, memory files, and data tables) 302, 304. The computer program then checks the current user from the Operating System and compares the user with the list of users in the record data table 306. If a match is found and if the record in the record data table has a .t. in the auto-login field, the computer program will automatically log the new user into the system. If the user is not found or if the auto-login is not equal to .t., then the computer program presents the user with a login screen and asks for a user name and password.

The computer program then checks for internet connectivity 308. If connected, the computer program checks to see if there are records to download 326. If there are records to download, the computer program downloads the records and adds them to the records already contained in the CHANGES.dbf Data Table. See 322, 324, 338.

At flow chart boxes 310, 312, and 328 the computer program checks for records to import and takes steps for importing the records. If the user imports 330 the record, KB_import checks 332 the record to see if it already exists. If the record exists, the superseded is overwritten with new information. If the record does not exist, it is added to the user's Changes.dbf.

Next, at flow chart box 314 the computer program looks for any notifications that will be listed in the UserAlerts.dbf file with the user's name and the record' Key ID field. Based on this, the notifications are placed in front of the user. The user can go to any record that is listed in the notification or the user can clear the notification so that the notification does not come up again 334. The computer program also looks for any records that have any empty "Solution" field and prompts the user for answers.

At 316, 318, and 320 the computer program sets up and activates the main menu and tool bar for permitting the user to navigate through the system and perform searches. Main menu 336 includes help menu 342, and files menu 372, edit menu 388, and system menu 396. Help menu 342 permits the user to go to provider website 340 using Internet connection 338. Help menu 342 also includes the following options: general information 344, connectivity test 346, registration forms 348, order form 350, and reenter 352.

Edit menu 388 permits the user to perform several editing functions 390, including undo, redo, select all, copy, cut, and paste. System menu 396 includes a user set-up function 400 and screen 404, which allows the user to add new users to the system, assign certain rights and passwords, and delete users. System menu 396 further comprises a topic setup 402 and topic setup screen 406, which allows the user to add new topics to the system, change topic colors, and delete topics. System menu 396 has a pack-and-reindex utility 398, which reviews all records in the database and removes any records marked for deletion. The pack-and-reindex utility 398 also creates indexes on the keywords, topics, creation date, users, and other fields that enable the system to work more efficiently.

From files menu 372, the CHList.prg is called 374 and activated 354 to show all of the records to the user in a "grid" format 356. From the files menu 372, the user can add a new record 376, view notifications 378, activate utility 380 (such as Dot Prompt 382, a program that allows the user to enter commands directly into the database), check for records in the provider's Master copy for downloading 384, and import 392 from any file having the same format as KBArticle.dbf. The "Return" function 394 permits the user to go from a record back to the main file menu.

From the grid-like listing of records 356, the user is provided with several functions, including: double click 358, which opens a particular record; show all 360, which removes all of the filters on the database except for the security filter and shows all records the user; search 362; unanswered 364, which shows records lacking a solution in the "Solution" field; delete 410 for deleting a record from the CHANGES.dbf table; and add new 408, for adding a new, blank article to the CHANGES.dbf table. Search function 362 provides the user with a search dialog box 370, in which search terms and phrases are entered 412 and other search criteria 414, 416 selected. When the user clicks "Search Now" 418, the records are filtered to include only those records satisfying the search criteria. Once that filter is established, further filtering is performed to remove records that the particular user lacks permission to view. The filtered results are then represented to the user.

If a record is double-clicked 358 or otherwise opened, the user is provided with the ability to edit 368 the record and is presented with an edit form 420, placing the program in edit mode 450. Available edit functions include: notes button 422, which allows the user to edit, add, and modify notes 424; open buttons 428 for opening attachments, websites, and folders; security button 430 for allowing the user to provide or deny management operations for a particular record; notify button 426 for bringing the user to the Notification form 436 and allowing the user to check off the user(s) that should be notified if a record is edited or deleted; add-a-copy button 432 for creating a new record and then copying all information from the existing record to the new record, and presenting the new record for editing; delete button 434; save and undo buttons 442 for either writing information to CHANGES.dbf or discarding the changes; e-mail 444 and export 446, which cooperate with an email program 452, 456 and send emails 458; return 454, for returning the user to the change edit form; scan button 440, for allowing the user to scan a document in PDF or other form into the system and save the same in memory; and print 438 and print preview 460, for sending a record to an attached printer 462.

The foregoing detailed description of the certain preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A record management and retrieval method, comprising:
    (a) providing a private search space comprising a plurality of electronically recallable internal information records having a keyword field for receiving an associated keyword, a title query field for providing an associated question, and a query solution field for providing an associated solution to the associated question of the title query field;
    (b) displaying the records in a format for viewing of the questions of the title query fields and the solutions of the query solution fields;
    (c) in response to a search query comprising a query search term, performing an electronic search of the records, and retrieving from the electronic search the record or records whose associated keyword in the keyword field matches the query search term;
    (d) presenting the retrieved record or records;
    (e) providing in the private search space an electronically recallable internal information record which is incomplete, the incomplete record having a keyword field with an associated keyword, a title guery field with an associated question, and a query solution field lacking an associated solution to the associated question of the title query field;
    (f) disseminating the incomplete record to one or more recipients having access to the private search space; and
    (g) permitting the recipients to update the incomplete record to include the associated solution; and
    (h) providing the incomplete record with an automatic notification feature for automatically notifying one or more recipients having access to the private search space whenever the incomplete record is modified.

2. The record management and retrieval method of claim 1, further comprising:
    (i) permitting electronic compilation of a list of incomplete records from the electronically recallable internal information records, the incomplete records having a keyword field with an associated keyword, a title query field with an associated question, and a query solution field lacking an associated solution to the associated question of the title query field.

3. The record management and retrieval method of claim 1, further comprising:
    (i) providing a selected one of the electronically recallable internal information records with an automatic notification feature for automatically notifying one or more recipients having access to the private search space whenever the selected electronically recallable internal information record is modified.

4. The record management and retrieval method of claim 1, further comprising:
    (i) linking attachments to the records.

5. The record management and retrieval method of claim 1, wherein the records comprise business records and non-business records.

6. The record management and retrieval method of claim 1, further comprising:
    (i) providing a security restriction authority for granting or denying users permission, on a record-by-record basis, to execute record management operations on the electronically recallable internal information records.

7. The record management and retrieval method of claim 1, wherein the format in which the records are displayed comprises a table.

8. The record management and retrieval method of claim 1, further comprising:
(i) permitting recipients having access to the private search space to edit and update the records.

9. A computer usable medium for managing and retrieving internal information records, the computer usable medium comprising:
(a) computer readable program code means for providing a private search space comprising a plurality of electronically recallable internal information records having a keyword field for receiving an associated keyword, a title query field for providing an associated question, and a query solution field for providing an associated solution to the associated question of the title query field;
(b) computer readable program code means for displaying the records in a format for viewing of the questions of the title query fields and the solutions of the query solution fields;
(c) computer readable program code means for performing an electronic search of the records in response to a search query comprising a query search term;
(d) computer readable program code means for retrieving from the electronic search the record or records whose associated keyword in the keyword field matches the query search term,
(e) computer readable program code means for presenting the retrieved record or records;
(f) computer readable program code means for disseminating an electronically recallable internal information record which is the incomplete record to one or more recipients having access to the private search space, the incomplete record having a keyword field with an associated keyword, a title guery field with an associated guestion, and a query solution field lacking an associated solution to the associated guestion of the title query field;
(g) computer readable program code means for permitting the recipients to update the incomplete record to include the associated solution; and
(h) computer readable program code means for providing the incomplete record with an automatic notification feature for automatically notifying one or more recipients having access to the private search space whenever the incomplete record is modified.

10. The computer usable medium of claim 9, further comprising:
(i) computer readable program code means for permitting electronic compilation of a list of incomplete records from the electronically recallable internal information records, the incomplete records having a keyword field with an associated keyword, a title query field with an associated question, and a query solution field lacking an associated solution to the associated question of the title query field.

11. The computer usable medium of claim 9, further comprising:
(i) computer readable program code means for providing a selected one of the electronically recallable internal information records with an automatic notification feature for automatically notifying one or more recipients having access to the private search space whenever the selected electronically recallable internal information record is modified.

12. The computer usable medium of claim 9, further comprising:
(i) computer readable program code means for linking attachments to the records.

13. The computer usable medium of claim 9, wherein the records comprise business records and non-business records.

14. The computer usable medium of claim 9, further comprising:
(i) computer readable program code means for providing a security restriction authority for granting or denying users permission, on a record-by-record basis, to execute record management operations on the electronically recallable internal information records.

15. The computer usable medium of claim 9, wherein the format in which the records are displayed comprises a table.

16. The computer usable medium of claim 9, further comprising:
(i) computer readable program code means for permitting recipients having access to the private search space to edit and update the records.

17. A system for managing arid retrieving internal information records, the system comprising:
(a) a computing device;
(b) an input device for receiving a user search query comprising a query search term;
(c) a private search space comprising a plurality of electronically recallable internal information records having a keyword field for receiving an associated keyword, a title query field for providing an associated question, and a query solution field for providing an associated solution to the associated question of the title query field;
(d) a computer program loaded on the computing device for displaying the records in a format for viewing of the questions of the title query fields and the solutions of the query solution fields, performing an electronic search of the records in response to a search query comprising a query search term, retrieving from the electronic search the record or records whose associated keyword in the keyword field matches the query search term, and presenting the retrieved record or records; and
(e) an output device displaying the retrieved record or records on the output device;
wherein the private search space includes an electronically recallable internal information record which is incomplete, the incomplete record having a keyword field with an associated keyword, a title query field with an associated question, and a query solution field lacking an associated solution to the associated question of the title query field;
wherein the incomplete record is disseminated to one or more recipients having access to the private search space for updating the incomplete record to include the associated solution, and
wherein the incomplete record has an automatic notification feature for automatically notifying one or more recipients having access to the private search space whenever the incomplete record is modified.

* * * * *